(12) United States Patent
Lohe et al.

(10) Patent No.: US 11,731,876 B2
(45) Date of Patent: Aug. 22, 2023

(54) METHOD FOR PRODUCING A FUNCTIONALIZED SEMICONDUCTOR OR CONDUCTOR MATERIAL AND USE THEREOF

(71) Applicant: SIXONIA TECH GMBH, Dresden (DE)

(72) Inventors: Martin R. Lohe, Dresden (DE); Xinliang Feng, Dresden (DE); Ali Shaygan Nia, Dresden (DE)

(73) Assignee: SIXONIA TECH GMBH, Dresden (DE)

( * ) Notice: Subject to any disclaimer, the term of this patent is extended or adjusted under 35 U.S.C. 154(b) by 273 days.

(21) Appl. No.: 16/954,410

(22) PCT Filed: Dec. 19, 2018

(86) PCT No.: PCT/EP2018/085825
§ 371 (c)(1),
(2) Date: Jun. 16, 2020

(87) PCT Pub. No.: WO2019/129573
PCT Pub. Date: Jul. 4, 2019

(65) Prior Publication Data
US 2021/0078865 A1    Mar. 18, 2021

(30) Foreign Application Priority Data
Dec. 29, 2017 (DE) ............... 10 2017 223 892.5

(51) Int. Cl.
*C01B 32/194* (2017.01)
*C01B 32/225* (2017.01)
*C25B 1/00* (2021.01)

(52) U.S. Cl.
CPC .......... *C01B 32/225* (2017.08); *C01B 32/194* (2017.08); *C25B 1/00* (2013.01); *C01B 2204/22* (2013.01)

(58) Field of Classification Search
CPC ............. C25B 1/00; C25B 1/01; C25B 1/135; C25B 1/50; C01B 32/184; C01B 32/19;
(Continued)

(56) References Cited

U.S. PATENT DOCUMENTS 9,169,568 B2 * 10/2015 Ling .................. C25B 1/00
2012/0261612 A1 * 10/2012 Suh ................ C01B 32/194
252/182.3

(Continued)

FOREIGN PATENT DOCUMENTS

CN       106589357 A  *  4/2017
EP       3153605 B1    11/2018
(Continued)

OTHER PUBLICATIONS

Song et al. ("Electrochemical anchoring of dual doping polypyrrole on graphene sheets partially exfoliated from graphite foil for high-performance supercapacitor electrode," Journal of Power Sources, 249, 2013, 48-58) (Year: 2013).*
(Continued)

*Primary Examiner* — Matthew R Diaz
(74) *Attorney, Agent, or Firm* — Heslin Rothenberg Farley & Mesiti P.C.

(57) ABSTRACT

The invention relates to a method for producing a functionalised semiconductor or conductor material from a layered structured base material by electrolytic exfoliation in an electrolysis cell, comprising at least one electrode pair consisting of first and second electrodes, and an aqueous and/or alcoholic electrolyte solution, containing sulphuric
(Continued)

Figure 1:
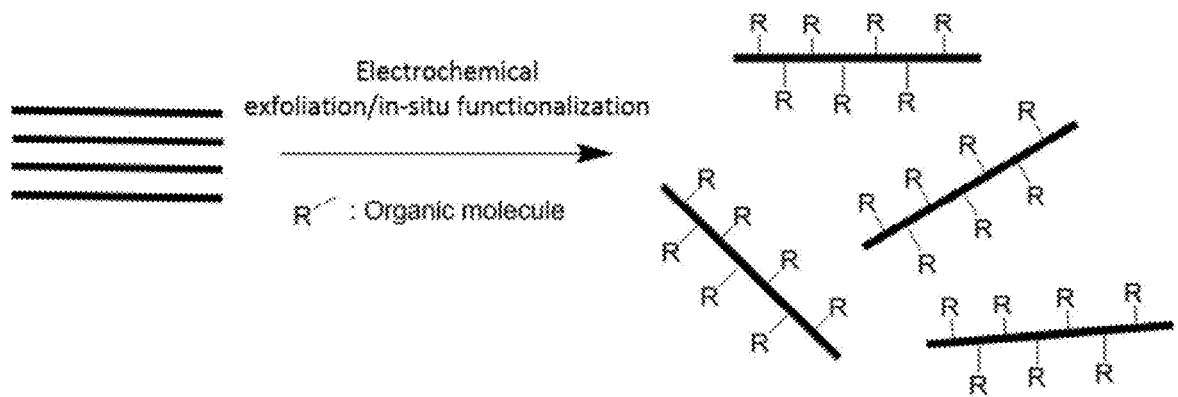

acid and/or at least one salt selected from sulphate and/or hydrogen sulphate and/or perchlorate and/or persulphate salt, comprising the steps of: a) bringing the electrodes into contact with the electrolyte solution; b) electronically exfoliating the base material by applying a voltage between the first and the second electrode; c) separating the functionalised conductor or semiconductor material from the electrolyte solution, wherein at least the first of the electrodes of the electrode pair contains the layered, carbon-based base material, the first electrode being connected as an anode, wherein at least one organic compound is added to the electrolyte solution before and/or during and/or immediately after the electrolytic exfoliation, wherein the organic compound is selected from i) anodically oxidisable organic molecules containing at least one alcohol group and/or at least one amino group and/or at least one carboxyl group, and/or ii) organic molecules containing at least one isocyanate group and/or at least one halide group and/or at least one epoxide group and/or at least one diazonium group and/or at least one peroxide group and/or at least one azide group and/or cyclic esters and/or cyclic amides, and/or iii) precursors or monomers of electrically conductive polymers, and/or iv) free-radical polymerisable, water-soluble vinyl monomers which have in their structure at least one amino group and/or at least one anionic functional group.

11 Claims, 25 Drawing Sheets

(58) Field of Classification Search
CPC ............. C01B 32/192; C01B 32/194; C01B 32/205; C01B 32/21; C01B 32/22; C01B 32/225; C01B 2204/22
See application file for complete search history.

(56) References Cited

U.S. PATENT DOCUMENTS

| | | | | |
|---|---|---|---|---|
| 2013/0164208 | A1* | 6/2013 | Hsieh | C25B 1/00 423/448 |
| 2016/0097133 | A1* | 4/2016 | Lai | C25B 1/00 205/450 |
| 2019/0051903 | A1* | 2/2019 | Manabe | C08K 9/04 |
| 2019/0194023 | A1* | 6/2019 | Gunasekaran | C25B 1/00 |
| 2019/0264337 | A1* | 8/2019 | Dryfe | C25B 1/135 |

FOREIGN PATENT DOCUMENTS

| | | | |
|---|---|---|---|
| JP | 2017/502168 A | 1/2017 | |
| KR | 20160072535 A | 6/2016 | |
| WO | 2012/064292 A1 | 5/2012 | |
| WO | WO-2012064292 A1 * | 5/2012 | ............. C25B 1/00 |
| WO | WO-2012120291 A1 * | 9/2012 | ............. C25B 1/00 |
| WO | WO-2015158711 A1 * | 10/2015 | ............. C25B 1/00 |
| WO | 2016/203388 A1 | 12/2016 | |
| WO | 2017/050689 A1 | 3/2017 | |
| WO | WO-2017050689 A1 * | 3/2017 | ............. C25B 1/00 |
| WO | WO-2017154533 A1 * | 9/2017 | ............. C01B 32/15 |
| WO | WO-2018050839 A1 * | 3/2018 | ............. C25B 1/00 |
| WO | 2019129573 A2 | 7/2019 | |

OTHER PUBLICATIONS

Chen et al. ("Towards the continuous production of high crystallinity graphene via electrochemical exfoliation with molecular in situ encapsulation," Nanoscale, 2015, 7, 15362-15373) (Year: 2015).*
Sun et al. ("In-situ growth of graphene/polyaniline for synergistic improvement of extracellular electron transfer in bioelectrochemical systems," Biosensors and Bioelectronics, 87, 2016, 195-202) (Year: 2016).*
Ossonon et al. ("Functionalization of graphene sheets by diazonium chemistry during electrochemical exfoliation of graphite," Carbon, 111, 2016, 83-93) (Year: 2016).*
Ejigu et al. ("Single stage simulataneous electrochemical exfoliation and functionalization of graphene," ACS Appl. Mater. Interfaces, 2016, 9, 710-721) (Year: 2016).*
Bepete et al. ("Surfactant-free single-layer graphene in water." Nature Chemistry, 2016, 10-1038) (Year: 2016).*
Shabafrooz et al. ("Graphene dispersion in a surfactant-free, polar solvent", J. Mater. Sci., 2018, 53, 559-572) (Year: 2017).*
International Search Report (and English translation) and Written Opinion of the International Searching Authority for International Application No. PCT/EP2018/085825 dated Jun. 24, 2019.
Ossonon, B.D., et al., "Functionalization of graphene sheets by the diazonium chemistry during electrochemical exfoliation of graphite", Carbon, vol. 111, pp. 83-93 (2016).
Sun, D., et al., "In-situ growth of graphene/polyaniline for synergistic improvement of extracellular electron transfer in bioelectrochemical systems", Biosensors and Bioelectronics, vol. 87, pp. 195-202 (2016).
Song, Y., et al., "Electrochemical anchoring of dual doping polypyrrole on graphene sheets partially exfoliated from graphite foil for high-performance supercapacitor electrode", Journal of Power Sources, vol. 249, pp. 48-58 (2013).
Chen, C.H., et al., "Towards the continuous production of high crystallinity graphene via electrochemical exfoliation with molecular in situ encapsulation", Nanoscale, vol. 7, pp. 15362-15373 (2015).
Ouhib, et al., "A facile and fast electrochemical route to produce functional few-layer graphene sheets for lithium battery anode application", Journal of Materials Chemistry A, vol. 2, pp. 15298-15302 (2014).
Novoselov, K.S., et al., "Electric Field Effect in Atomically Thin Carbon Films," Science, vol. 306, pp. 666-669 (2004).
Leon, V., et al., "Few-Layer Graphenes From Ball-Milling of Graphite with Melamine," Chem. Commun., Vo. 47, pp. 10936-10938 (2011).
Xia, Z.Y., et al., "The Exfoliation of Graphene in Liquids by Electrochemical, Chemical and Sonication-Assisted Techniques: A Nanoscale Study," Adv. Funct. Mater., vol. 23, pp. 4684-4693 (2013).
Ciesielski, A., et al., "Graphene via Sonication Assisted Liquid-Phase Exfoliation," Chem. Soc. Rev., vol. 43, pp. 381-398 (2014).
Munuera, J.M., et al., "Electrolytic exfoliation of graphite in water with multifunctional electrolytes: en route towards high quality, oxide-free graphene flakes", Nanoscale, vol. 8, No. 5, pp. 2982-2998 (2016).
Gómez-Navarro, C., et al., "Electronic Transport Properties of Individual Chemically Reduced Graphene Oxide Sheets," Nano Lett., vol. 7, pp. 3499-3503 (2007).
Bonaccorso, F., et al., "2d-Crystal-Based Functional Inks," Adv. Mater., vol. 28, pp. 6136-6166 (2016).
Ciesielski, A., et al., "Harnessing the Liquid-Phase Exfoliation of Graphene Using Aliphatic Compounds: A Supramolecular Approach," Angew. Chem. Int. Ed., vol. 53, pp. 10355-10361 (2014).
Coleman, J.N., et al., "Liquid Exfoliation of Defect-Free Graphene," Acc. Chem. Res., vol. 46, pp. 14-22 (2012).
Wang, X., et al., "Direct Exfoliation of Natural Graphite into Micrometre Size Few Layers Graphene Sheets Using Ionic Liquids," Chem. Commun., vol. 46, pp. 4487-4489 (2010).
Rao, K.S., et al., "Soft Processing of Graphene Nanosheets by Gycine-Bisulfate Ionic-Complex-Assisted Electrochemical Exfoliation of Graphite for Reduction Catalysis," Adv. Funct. Mater., vol. 25, pp. 298-305 (2014).
Parvez, K., et al., "Electrochemically Exfoliated Graphene as Solution-Processable, Highly Conductive Electrodes for Organic Electronics," ACS Nano, vol. 7, pp. 3598-3606 (2013).
Parvez, K., et al., "Exfoliation of Graphite into Graphene in Aqueous Solutions of Inorganic Salts," J. Am. Chem., Soc., vol. 136, pp. 6083-6091 (2014).
Yang, S., et al., "Organic Radical-Assisted Electrochemical Exfoliation for the Scalable Production of High-Quality Graphene," J. Am Chem. Soc., vol. 137, pp. 13927-13932 (2015).

(56) References Cited

OTHER PUBLICATIONS

Khanra, P., et al., "Electrochemically exfoliated graphene using 9-anthracene carboxylic acid for supercapacitor application", Journal of Materials Chemistry, vol. 22, No. 46, pp. 24403-24410 (2012).

Mensing, J.P., et al., "Facile preparation of graphene-metal phthalocyanine hybrid material by electrolytic exfoliation", Journal of Materials Chemistry, vol. 22, No. 33, pp. 17094-17099 (2012).

Feng, X., et al., "Studies on Synthesis of Electrochemically Exfoliated Functionalized Graphene and Polylactic Acid/Ferric Phytate Functionalized Graphene Nanocomposites as New File Hazard Suppression Materials", ACS Applied Materials & Interfaces, vol. 8, No. 38, pp. 25552-25562 (2016).

Cai, W., et al., "A novel strategy to simultaneously electrochemically prepare and functionalize graphene with a multifunctional flame retardant", Chemical Engineering Journal, vol. 316, pp. 514-524 (2017).

Khanra, P., et al., "7,7,8,8-Tetracyanoquinodimethane-assisted one step electrochemical exfoliation of graphite and its performance as an electrode material", Nanoscale, vol. 6, No. 9, pp. 4864-4873 (2014).

\* cited by examiner

METHOD FOR PRODUCING A FUNCTIONALIZED SEMICONDUCTOR OR CONDUCTOR MATERIAL AND USE THEREOF

CROSS REFERENCE TO RELATED APPLICATIONS

This application is a national stage filing under section 371 of International Application No. PCT/EP2018/085825 filed on Dec. 19, 2018, and published on Jul. 4, 2019 as WO 2019/129573, which claims priority to German Application No. 10 2017 223 892.5, filed on Dec. 29, 2017. The entire contents of WO 2019/129573 are hereby incorporated herein by reference.

The invention relates to a method for producing and functionalising a semiconductor or conductor material by electrolytically exfoliating a base material and in situ functionalising the layers and/or monolayers formed.

PRIOR ART

The isolation of individual layers of two-dimensional structured or layered semiconductor or conductor materials has been of interest for several years, not least because the use of these materials in electronic components leads to enormous increases in performance and efficient applications.

An example of such an isolated layer of a two-dimensional structured or layered material is graphene, which represents a monolayer, i.e. a single layer of graphite, a naturally occurring form of carbon in pure form, which is only one atomic layer thick. However, graphene also refers to material in which some of these monolayers are layered on top of one another.

Graphene can be understood to be a two-dimensional network of chained benzene rings, which, among other things, has an enormous electrical conductivity. Due to its electronic, thermal, optical and mechanical properties, its use is of great interest in many fields of technology. Methods for the scalable and efficient production of high-quality conductor and semiconductor materials, such as graphene, which can be processed from solution, are therefore the subject of intensive research.

Graphene, for example, is produced under sometimes difficult process conditions, since high-boiling solvents such as DMF and NMP are used on a laboratory scale. Up-scaling to an industrial scale is therefore extremely problematic and has hitherto prevented the large-scale production and use of this material.

Another challenge is the storage of the freshly produced graphene, since it is difficult to redisperse after drying and the processability of the material monolayers or oligolayers is extremely difficult.

One of the most important, but not yet widely used technologies for producing monolayers or thin layers of conductor materials such as graphene is the electrolytic exfoliation of a two-dimensional layered structured base material, such as graphite.

The exfoliation of graphite to produce graphene, for example in the form of flakes, is an inexpensive and reliable strategy for its extraction.

Graphene layers as flakes have already been successfully isolated from graphite as a base material in the solid state (for example, see i) K. S. Novoselov, A. K. Geim, S. V. Morozov, D. Jiang, Y. Zhang, S. V. Dubonos, I. V. Grigorieva, A. A. Firsov, Science 2004, 306, 666-669; ii) V. Leon, M. Quintana, M. A. Herrero, J. L. G. Fierro, A. d. I. Hoz, M. Prato, E. Vazquez, Chem. Commun. 2011, 47, 10936-10938) or in the liquid phase (for example, see i) Z. Y. Xia, S. Pezzini, E. Treossi, G. Giambastiani, F. Corticelli, V. Morandi, A. Zanelli, V. Bellani, V. Palermo, Adv. Funct. Mater. 2013, 23, 4684-4693; b) A. Ciesielski, P. Samori, Chem. Soc. Rev. 2014, 43, 381-398).

Graphene was also successfully produced by reducing graphene oxide, which can be produced, for example, by the so-called Hummers method (W. S. Hummers et al. J. Am. Chem. Soc. 1958, 80, 6, 1339).

Graphene oxide is excellently dispersible in a variety of solvents, especially water, which greatly facilitates implementation of an application on a larger scale. It is also redispersible after complete drying.

However, the reduction methods always have the disadvantage that oxide groups and other defects, such as holes or non-six-fold rings, remain within the material. These structural defects lead to severe restrictions on the electronic and thermal properties of the graphene produced from graphene oxide (C. Gómez-Navarro, R. T. Weitz, A. M. Bittner, M. Scolari, A. Mews, M. Burghard, K. Kern, Nano Lett. 2007, 7, 3499-3503).

The so-called liquid-phase exfoliation of graphite uses purely physical shear forces in primarily organic solvents and allows the production of graphene with significantly fewer defects (for example, see a) F. Bonaccorso, A. Bartolotta, J. N. Coleman, C. Backes, Adv. Mater. 2016, 28, 6136-6166; b) A. Ciesielski, S. Haar, M. El Gemayel, H. Yang, J. Clough, G. Melinte, M. Gobbi, E. Orgiu, M. V. Nardi, G. Ligorio, V. Palermo, N. Koch, O. Ersen, C. Casiraghi, P. Samori, Angew. Chem. Int. Ed. 2014, 53, 10355-10361). Disadvantageously, however, this only results in low yields of exfoliated graphene and very small lateral layer sizes (J. N. Coleman, Acc. Chem. Res. 2013, 46, 14-22).

In addition, the small material platelets tend to congregate (stack) again after the exfoliation. The use of surfactants or other additives to prevent this effect is inevitable. However, these additives are difficult to remove and significantly reduce the conductivity of the product.

Anodic exfoliation has recently established itself as a very promising method for producing high-quality graphene on a large scale, at low cost and in aqueous solution.

The two-dimensional structured base material can be connected either as an anode in aqueous solutions of ionic liquids (for example, see X. Wang, P. F. Fulvio, G. A. Baker, G. M. Veith, R. R. Unocic, S. M. Mahurin, M. Chi, S. Dai, Chem. Commun. 2010, 46, 4487-4489) or mineral acids (for example, see a) K. S. Rao, J. Sentilnathan, H.-W. Cho, J.-J. Wu, M. Yoshimura, Adv. Funct. Mater. 2015, 25, 298-305; b) K. Parvez, R. Li, S. R. Puniredd, Y. Hernandez, F. Hinkel, S. Wang, X. Feng, K. Müllen, ACS Nano 2013, 7, 3598-3606) or inorganic salts (e.g. a) K. Parvez, Z.-S. Wu, R. Li, X. Liu, R. Graf, X. Feng, K. Müllen, J. Am. Chem. Soc. 2014, 136, 6083-6091; b) S. Yang, S. Brüller, Z.-S. Wu, Z. Liu, K. Parvez, R. Dong, F. Richard, P. Samori, X. Feng, K. Müllen, J. Am. Chem. Soc. 2015, 137, 13927-13932). Under the influence of the electric current, electrons are separated from the two-dimensional structured base material, e.g. graphite, and leave a positive charge on the anode. The anions of the electrolyte can then easily be pushed between the individual layers of the base material, e.g. graphite, and separate them.

However, graphene produced in this way has the disadvantage of high proportions of oxygen groups. This is due to oxygen radicals such as HO$^-$ or O$^-$, which are formed during the production process by splitting water and add to the graphene layers (see K. S. Rao, J. Sentilnathan, H.-W. Cho, J.-J. Wu, M. Yoshimura, *Adv. Funct. Mater.* 2015, 25, 298-305).

The implementation of the method in high-boiling solvents such as DMF or NMP is also problematic. In addition, the exfoliated layers stick back together after drying and it is difficult to redisperse them.

One way to increase the dispersibility of the graphene layers is to functionalise the graphene layers with small molecules or polymers.

Earlier work has covered the cathodic exfoliation of graphite in organic solvents and the simultaneous, in situ functionalisation of graphene layers with diazonium salts (see, inter alia, a) Ejigu, A.; Kinloch, I. A.; Dryfe, R. A. W., Single Stage Simultaneous Electrochemical Exfoliation and Functionalization of Graphene. *ACS Applied Materials & Interfaces* 2017, 9 (1), 710-721; b) Zhong, Y. L.; Swager, T. M., Enhanced Electrochemical Expansion of Graphite for in Situ Electrochemical Functionalization. *Journal of the American Chemical Society* 2012, 134 (43), 17896-17899; c) Ossonon, B. D.; Bélanger, D., Functionalization of graphene sheets by the diazonium chemistry during electrochemical exfoliation of graphite. *Carbon* 2017, 111, 83-93.) Diazonium salts generate free radicals and functionalise the surface through a reduction reaction at the cathode.

Other publications cover the anodic exfoliation of graphite using various organic salts as electrolytes such as phytic acid (Feng, X.; Wang, X.; Cai, W.; Qiu, S.; Hu, Y.; Liew, K. M., Studies on Synthesis of Electrochemically Exfoliated Functionalized Graphene and Polylactic Acid/Ferric Phytate Functionalized Graphene Nanocomposites as New Fire Hazard Suppression Materials. *ACS Applied Materials & Interfaces* 2016, 8 (38), 25552-25562), hex(4-carboxylphenoxy) cyclotriphosphazene (Cai, W.; Feng, X.; Wang, B.; Hu, W.; Yuan, B.; Hong, N.; Hu, Y., A novel strategy to simultaneously electrochemically prepare and functionalize graphene with a multifunctional flame retardant. *Chemical Engineering Journal* 2017, 316, 514-524), tetracyanoquinodimethane (Khanra, P.; Lee, C.-N.; Kuila, T.; Kim, N. H.; Park, M. J.; Lee, J. H., 7,7,8,8-Tetracyanoquinodimethane-assisted one-step electrochemical exfoliation of graphite and its performance as an electrode material. *Nanoscale* 2014, 6 (9), 4864-4873), 9-anthracene carboxylic acid (Khanra, P.; Kuila, T.; Bae, S. H.; Kim, N. H.; Lee, J. H., Electrochemically exfoliated graphene using 9-anthracene carboxylic acid for supercapacitor application. *Journal of Materials Chemistry* 2012, 22 (46), 24403-24410), tetrasodium tetrasulfonic acid (Mensing, J. P.; Kerdcharoen, T.; Sriprachuabwong, C.; Wisitsoraat, A.; Phokharatkul, D.; Lomas, T.; Tuantranont, A., Facile preparation of graphene-metal phthalocyanine hybrid material by electrolytic exfoliation. *Journal of Materials Chemistry* 2012, 22 (33), 17094-17099), or organic sodium sulphonates (Munuera, J. M.; Paredes, J. I.; Villar-Rodil, S.; Ayan-Varela, M.; Martinez-Alonso, A.; Tascon, J. M. D., Electrolytic exfoliation of graphite in water with multifunctional electrolytes: en route towards high quality, oxide-free graphene flakes. *Nanoscale* 2016, 8 (5), 2982-2998).

These publications describe the intercalation of the salt between the individual layers of graphite and the functionalisation of the layers through p-p interactions.

The graphene layers functionalised in this way show high $I_D/I_G$ ratios in the RAMAN spectrum.

The conductivity of the layers and their dispersibility are not considered.

In some examples, the use of functionalised graphene as an electrode material in batteries or supercapacitors is described.

Other publications show the exfoliation of graphite with mixed electrolytes such as ammonium sulphate/ammonia or glycine and ammonia. $Na_2S_2O_3/H_2SO_4$ systems and potassium halides were also used to dope the graphene with heteroatoms or halogens.

Chen et al. (Chen, C. H. et al. *Nanoscale*, 2015, 7, 15362-15373) published a method for producing highly crystalline graphene by electrolytic exfoliation in 0.65 M sulphuric acid with the addition of melamine in high concentrations of 10 to 200 g/100 ml electrolyte solution. At voltages of 20 V, with a periodic reversal of polarity with a period of 10 min, graphene layers are exfoliated from the graphite electrode and affected with melamine molecules. These protective layers applied in situ prevent further oxidation of the graphene layer and thus result in larger graphene crystallites. The remaining melamine is then washed off the collected graphene with water, which after drying shows a high C/O ratio of 26.17, i.e. a low defect density of oxygen defects. The authors assume that there is no covalent functionalisation of the graphene platelets. Graphene produced in this way is readily dispersible in DMF or NMP. Among other things, the use of a dispersion of graphene in DMF for processing on quartz substrates is indicated.

Another possibility for producing functionalised graphene is the use of ionic liquids, i.e. salts which are liquid at temperatures below 100° C., without the salt being dissolved in a solvent such as water.

A publication by Liu et al. (Adv. Funct. Mater. 2008, 18, 1518-1525) describes the electrolytic exfoliation of graphite in an aqueous electrolyte solution containing ionic liquids. The cations of the ionic liquids intercalate between the individual layers of graphite and thus drive them apart. In this case, an imidazolium hexafluorophosphate was used as the ionic liquid. XPS measurements showed that the two nitrogen atoms of the imidazolium group interact with the surface of the graphene and thus bind the salt to the graphene. Graphene functionalised in this way is not dispersible in water, but in aprotic solvents such as DMF or NMP.

In 2014, Ouhib et al. published a method for producing functionalised graphene from a few layers (Ouhib et al. *J. Mater. Chem. A,* 2014, 2, 15298). Highly ordered pyrolytic graphite (HOPG) was introduced as a cathode in an electrolytic cell with an electrolyte containing an ammonium salt and vinyl monomers, and graphene layers were exfoliated. The vinyl monomers were electropolymerised in parallel, wherein a chemisorbed polymer layer was formed around the graphene layers. Disadvantageously, the electrolysis again took place in anhydrous, high-boiling organic solvents such as DMF, and the exfoliation only took place with the aid of an ultrasound treatment. Cathodic exfoliation also ensures that no monolayers of graphene can be formed, but rather graphite nanoplatelets with >20 to 50 atomic layers, as can be seen in the Raman spectrum of the sample in FIG. 2 of the publication. In contrast to graphite, few-layer graphene would show a symmetrical 2D peak without shoulder at ~2700 $cm^{-1}$ in the spectrum, but this can be clearly seen in FIG. 2.

WO 2012/064292 discloses a method for producing polymer-graphene composites, wherein graphene layers are electrolytically exfoliated by graphite electrodes. The exfoliation is carried out in a polymer solution, wherein PDOT-PSS is preferably used as the polymer. Composites are formed with conductive polymers, which are readily dispersible. Disadvantageously, only polymerised electrolyte additives are used in the method, compared to the corresponding monomers. It can be assumed that the polymers used in the electrolyte solution assume both the role of exfoliating agent intercalating into the graphite layers and the role of graphene functionalisation. Due to the voluminous size of the polymer molecules, a kinetically inhibited and accordingly slow intercalation process can be assumed, which is also indicated by the long exfoliation times of up to 40 hours.

KR 20160072535 A describes a process for producing graphene nanofilms by electrochemical exfoliation in a persulphate electrolyte solution. For this purpose, the washed and dried electrodes are immersed in an appropriate electrolyte solution and exfoliated at a voltage of 1 to 20 V, wherein graphene nanofilms are formed. These are then separated from the electrolyte solution by filtration and washed with distilled water. To produce a nano-ink, the nanofilm particles are dispersed in an organic solvent such as N-methyl-pyrrolidinone (NMP) or DMF in a concentration of 0.5 to 20 mg/ml using ultrasound, with the aim of preventing the nanofilm particles from re-attaching to one another. Disadvantageously, more or less strongly oxidised, but not specifically functionalised graphene films can be produced in the method.

A method of covalently chemically functionalising the exfoliated layers of conductor or semiconductor materials, such as graphene, in situ, for example to protect them from attack by hydroxyl radicals (oxidation) and/or at the same time to increase the dispersibility of the layers in environmentally-friendly, for example aqueous, solvents without the addition of surface-active additives is not known from the prior art.

The object of the invention is to provide a method for producing functionalised semiconductor or conductor materials by electrolytic exfoliation in environmentally-friendly and easily usable solvents on an industrial scale with simultaneous and/or immediate functionalisation of the monolayers or thin layers of the material for improved dispersibility and easier processing.

The object is achieved by a method for producing functionalised semiconductor or conductor materials from a layered structured base material by electrolytic exfoliation in an electrolysis cell, comprising at least one electrode pair consisting of first and second electrodes, and an aqueous and/or alcoholic electrolyte solution, containing sulphuric acid and/or at least one sulphate salt and/or hydrogen sulphate salt and/or perchlorate and/or persulphate,
  comprising the steps of:
  a) bringing the electrodes into contact with the electrolyte solution,
  b) electrolytically exfoliating the base material, for example in the form of particles of functionalised conductor or semiconductor material, by applying a voltage between the first and the second electrode,
  c) separating the functionalised semiconductor or conductor material from the electrolyte solution,
  wherein at least the first of the electrodes of the electrode pair contains the layered, carbon-based base material, the first electrode being connected as an anode, wherein at least one organic compound is added to the electrolyte solution before and/or during and/or immediately after the electrolytic exfoliation, wherein the organic compound is selected from
    i) anodically oxidisable organic molecules containing at least one alcohol group and/or at least one amino group and/or at least one carboxyl group, and/or
    ii) organic molecules containing at least one isocyanate group and/or at least one halide group and/or at least one epoxide group and/or at least one diazonium group and/or at least one peroxide group and/or at least one azide group and/or cyclic esters and/or cyclic amides, and/or
    iii) precursors or monomers of electrically conductive polymers, and/or
    iv) free radical polymerisable, water-soluble vinyl monomers which have in their structure at least one amino group (for example isopropylacrylamide) and/or one anionic functional group (for example $SO_3^-$, $NO_2^-$, $CO_2^{-2}$, $PO_3^{-3}$, $O^-$) (for example styrene sulphonate).

Within the context of the invention, a conductor or semiconductor material is an electrically conductive material with a highly ordered, layered structure, consisting of a monolayer of the material or a plurality of layers of the material arranged one above the other. The semiconductor material has a specific band gap, which is formed from the energy difference between the valence band and the conduction band.

Within the context of the invention, "functionalised" means that the material is coated with functional groups or polymer chains which adhere to the surface of the material by chemical reaction or at least chemisorption.

In one embodiment, the semiconductor or conductor material is a carbon-based material, i.e. its basic structure primarily contains carbon.

In one embodiment, the functionalised semiconductor or conductor material is in the form of particles with dimensions in the nanometre to micrometre range.

In one embodiment, the semiconductor or conductor material is selected from graphene, graphene derivatives, carbon-based semiconductor or conductor polymers and/or layered chalcogenides of the general formula $MQ_2$, wherein M=Ti, Zr, Hf, V, Nb, Ta, Mo or W and wherein Q=O, S, Se or Te.

In one embodiment, the two-dimensional layered structured base material is selected from semiconductive or conductive carbon modifications, carbon-based semiconductor or conductor polymers in the form of two-dimensional structured base material and/or layered chalcogenides.

In one embodiment, the semiconductive or conductive carbon modifications are selected from graphite, non-graphitic carbon, carbon nanofoam, glassy carbon, carbon black, activated carbon, carbon fibres, tar and pitch and their derivatives.

Graphite can be naturally occurring or synthetically produced graphite.

The exfoliation of the semiconductor or conductor material from the two-dimensional layered structured base material takes place electrolytically in an electrolysis cell which contains at least one electrode pair. An electrode pair comprises a first electrode E1 and a second electrode E2.

In one embodiment, at least the first electrode E1 contains the base material in the form of flakes, powder, fibres, foils, pieces, pastes or a mixture of these. The electrode can also be a single flake of the base material, or several of these flakes, which are either pressed together or connected to one another by a conductive material.

According to the invention, the electrode E1 is connected as an anode during the exfoliation.

In one embodiment, the second electrode comprises a metal. In one embodiment, the metal is a noble metal selected from Cu, Au, Ag, Pt, Pd.

In another embodiment, the metal is a non-noble metal or an alloy selected from Fe, steel, Al, Pb, brass, Ti, Zn, Sn, Ni, Hg, Mg.

In one embodiment, the metal-containing electrode is connected as the cathode during the exfoliation.

In one embodiment, the second electrode comprises a non-element metal conductive material.

In one embodiment, the non-element metal material is selected from graphite, carbon and/or conductive polymers.

In one embodiment, the non-element metal electrode is connected as the cathode during the exfoliation.

According to the invention, the electrolyte solution is an aqueous and/or alcoholic solution.

In one embodiment, the solution is aqueous and alcoholic, i.e. it contains a mixture of water and alcohol.

In one embodiment, the water/alcohol ratio is 100:0 to 0:100, preferably 99:1 to 1:99, particularly preferably 20:80 to 80:20.

In one embodiment, the alcohol comprises only one alcoholic component. In another embodiment, the alcohol comprises a number of different alcoholic components.

In one embodiment, the alcohol is selected from ethanol and/or ethylene glycol.

According to the invention, the electrolytic solution contains sulphuric acid and/or at least one salt selected from sulphate and/or hydrogen sulphate and/or perchlorate and/or persulphate salt.

Within the context of the invention, the salt comprises either only one salt component or a mixture of several salt components.

In one embodiment, the salt is an inorganic salt.

In one embodiment, the inorganic salt is selected from $(NH_4)_2SO_4$ and/or $K_2SO_4$ and/or $Na_2SO_4$ and/or $KHSO4$ and/or $NaHSO_4$ and/or a persulphate.

In one embodiment, the salt is an organic salt. In one embodiment, the organic salt is selected from tetraalkylammonium sulphates and/or tetraalkylammonium hydrogen sulphates.

The cation of the salt thus corresponds to the general formula $NR_4^+$, with R=H and/or C1 to C5-alkyl, wherein all Rs can be the same or different.

In step a), the electrodes are brought into contact with the electrolyte solution.

In one embodiment, the electrodes are immersed in the electrolyte solution. In another embodiment, the electrolyte solution is added to the electrodes in the electrolytic cell.

In step b), the base material is electrolytically exfoliated by applying a voltage between the first and second electrodes.

In one embodiment, the voltage is 1 to 30 V, preferably 5 to 15 V, particularly preferably 8 to 12 V, in particular 10 V.

According to the invention, at least the first electrode E1 contains the two-dimensional structured layered base material. This electrode E1 is connected as an anode. By applying a voltage, oxygen-containing radicals such as HO or O are initially formed in the anode region, which attack and add to the interfaces or intrinsic defects of the base material, wherein oxides of the base material are formed. At the same time, the peripheral layers of the base material are driven apart, so that the anions of the electrolyte, i.e. sulphate and/or hydrogen sulphate ions, can slide far in between and widen the distance between the individual layers of the base material.

The intercalation of the anions of the electrolyte leads to the widening of the distance between the layers to the extent that the intermolecular forces can be overcome so that individual layers separate from the electrode. Thus, the monolayer or multiple layer or a thin layer of the base material is exfoliated from the electrode.

These monolayers or multiple layers or layers of the base material are coated or functionalised in situ with the organic compound contained in or added to the electrolyte solution.

According to the invention, at least one organic compound is added to the electrolyte solution before and/or during and/or after the electrolytic exfoliation.

According to the invention, the at least one organic compound is selected from
  i) anodically oxidisable organic molecules containing at least one alcohol group and/or at least one amino group and/or at least one carboxyl group, and/or
  ii) organic molecules containing at least one isocyanate group and/or at least one halide group and/or at least one epoxide group and/or at least one diazonium group and/or at least one peroxide group and/or at least one azide group and/or cyclic esters and/or cyclic amides, and/or
  iii) precursors or monomers of electrically conductive polymers, and/or
  iv) free radical polymerisable, water-soluble vinyl monomers which have in their structure at least one amino group (for example isopropylacrylamide) and/or at least one anionic functional group (for example $SO_3^-$, $NO_2^-$, $CO_2^{-2}$, $PO_3^{-3}$, $O^-$) (for example styrene sulphonate).

Variants i) to iv) can be combined with one another as desired.

According to the invention, the at least one organic compound in variant i) is selected from anodically oxidisable organic molecules containing at least one alcohol group and/or at least one amino group and/or at least one carboxyl group (see Table 1).

In aqueous solution, the alcohol groups and/or amino groups and/or carboxyl groups are in equilibrium with their deprotonated i.e. anionic form.

By applying a voltage between electrodes E1 and E2, due to their partially negative charge, the anodically oxidisable organic molecules migrate/diffuse into the anode region and are electrolytically oxidised there, i.e. an electron is abstracted. Radicals are formed according to the following equations:

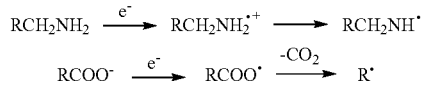

These radicals react with the surface of the semiconductor and/or conductor material and functionalise it by forming a coating of molecules.

In one embodiment, the organic molecules are selected from primary and/or secondary amines and/or carboxylic acids and/or alcohols.

According to the invention, the at least one organic compound in variant ii) is selected from organic molecules containing at least one isocyanate group and/or at least one halide group and/or at least one epoxide group and/or at least one diazonium group and/or at least one peroxide group and/or at least one azide group and/or cyclic esters and/or cyclic amides.

Depending on the functionality of the molecules, the organic compound in variant i) is preferably added before and/or during and/or immediately after the electrolytic exfoliation.

TABLE 1

| Functional group | Time of addition of the molecule | Notes/examples/ functionalisation mechanisms |
|---|---|---|
| R—OH "Alcohols" R: aromatic and aliphatic | before/during and/or after | e.g.: isobutanol |
| R—COOH R—COO- R—COX "Carboxylic acids/carboxylates" R: aromatic and aliphatic | before/during and/or after | e.g.: valeric acid, benzoic acid, sodium cholate |

According to the invention, the organic compound in variant ii) is selected from organic molecules containing at least one isocyanate group and/or at least one halide group and/or at least one epoxide group and/or at least one diazonium group and/or at least one peroxide group and/or at least one azide group and/or cyclic esters and/or cyclic amides.

In one embodiment, the organic compound in variant ii) is added immediately after the electrolytic exfoliation of the semiconductor or conductor material.

Table 2 lists substance groups of organic compounds according to variant ii), the time of their addition and selected examples of the substance groups (see Table 2).

The radicals R are generally organic compounds, each of which has at least one of the functional groups listed in the table. The preferred embodiment of the radicals R (aromatic and/or aliphatic) is specified in Table 1 in the "functional group" column.

TABLE 2

| Functional group | Time of addition of the molecule | Notes / examples / functionalisation mechanisms |
|---|---|---|
| R—CNH "Isocyanates" R: aromatic and aliphatic | after | |
| R—Hal "Halides" R: aromatic and aliphatic | after | |
| R—NH$_2$ R—NHR "Amines" R: aromatic and aliphatic | before/during and/or after | Preferably primary amines, e.g. melamine, butylamine, t-octylamine |
| R—epoxide "Epoxies" R: aromatic and aliphatic | after | |
| R—C$_6$H$_4$—N$_2^+$ "Diazoniums" R: aromatic and aliphatic | after | |
| R—O—O—R "Peroxides" R: aromatic | after | |

TABLE 2-continued

| Functional group | Time of addition of the molecule | Notes / examples / functionalisation mechanisms |
|---|---|---|
| NaN$_3$, R—N$_3$ R—N$_3$ R: aromatic and aliphatic "Azides" | after | |
| cyclic ester structure "Cyclic esters" | after | Cationic ring-opening polymerisation |
| cyclic amide structure "Cyclic amides" R: aliphatic | | |

According to the invention, the organic compound in variant iii) is selected from anodically or oxidatively polymerisable precursors or monomers of electrically conductive polymers.

In one embodiment, the precursors or monomers of the electrically conductive polymers in variant iii) are selected from aromatic amines, anilines, pyrroles, thiophenes and/or their derivatives.

In one embodiment, the electrically conductive polymers in variant iii) are selected from substituted and/or unsubstituted polyanillins, polypyrroles, and/or polythiophenes.

In one embodiment, a substituted polyaniline is sulphonated polyaniline.

The conductor or semiconductor material is functionalised with the compounds according to variant iii) by oxidative polymerisation.

Just as with functionalisation with small organic anodically oxidisable molecules, the anions of the electrolyte intercalate between the individual layers of the base material during electrolysis and drive them apart until they separate. In parallel, the monomers or precursors of the electrically conductive polymers are anodically oxidised, i.e. an electron is abstracted, so that radical cations are formed. These react with the surface of the exfoliated semiconductor or conductor material and continue to polymerise there. As a result, a polymer coating forms on the monolayers and/or multiple layers or layers of the conductor material and functionalises them.

In one embodiment, anodically or oxidatively polymerisable precursors or monomers of electrically conductive polymers are added immediately after the electrochemical exfoliation of semiconductor or conductor material.

The proposed mechanism for functionalisation immediately or directly after the exfoliation is shown in FIG. 14. Through the process of electrochemical exfoliation, there are free radicals on the surface of the EG, which are stabilised by the extensive network of conjugated electrons. These radicals and anions can be used as a starting point for free radical and oxidative polymerisation reactions in order to covalently functionalise the graphene surface. Another possible mechanism is the activation of oxygen-containing groups (in particular epoxy) on the graphene surface by electrochemical exfoliation.

According to the invention, the organic compound in variant iv) is selected from free radical polymerisable, water-soluble vinyl monomers which have in their structure at least one amino group and/or one anionic functional group (Table 3).

In one embodiment, the anionic functional group is selected from $SO_3^-$, $NO_2^-$, $CO_2^{-2}$, $PO_3^{-3}$, $O^-$ (for example isopropylacrylamide or styrene sulphonate).

TABLE 3

| Functional group | Time of addition of the molecule | Notes / examples / functionalisation mechanisms |
|---|---|---|
| R⌒═ "Vinyl connections" R: aromatic and aliphatic | before/during and/or after | Polymerisation (free radical, cationic) e.g.: N-isopropylacrylamide, methylene bisacrylamide, sodium 4-vinylbenzenesulphonate |

In variant iv) of the method according to the invention, free radical polymerisation of the water-soluble vinyl monomers takes place.

Vinyl monomers would normally polymerise at the cathode based on the reduction reaction of the vinyl group (mechanism of anionic polymerisation). For such reactions, water-free organic solvents are typically used in a protective gas atmosphere in the prior art.

However, if such monomers contain functional groups that oxidise faster than the vinyl group is reduced, or if they contain anionic groups such as $SO_3^-$, $NO_2^-$, $CO_2^-$, $PO_3^-$, they move to the anode and, activated by free radicals from water splitting, can perform free radical polymerisation (see FIG. 1).

This type of polymerisation has been successfully performed, for example, for monomers such as isopropylacrylamide and vinyl monomers (for example, see FIG. 1b) containing anionic groups (such as sodium 4-vinylbenzene-sulphonate, FIG. 1b).

Anode:

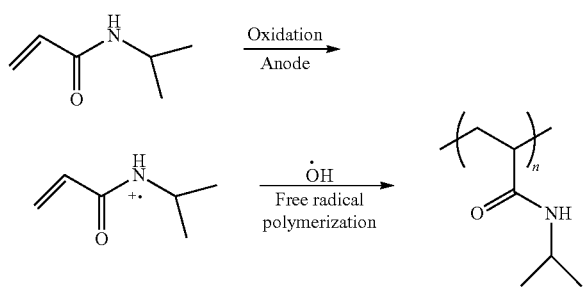

FIG. 1a) Radical Polymerisation of Isopropylacrylamide

Anode:

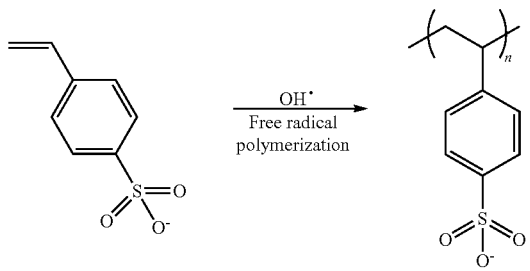

FIG. 1b) Radical Polymerisation of Sodium 4

Surprisingly, it was found that polymerisation in the presence of exfoliated conductor or semiconductor material led to polymer-functionalised conductor or semiconductor material.

In step c) of the method according to the invention, the functionalised semiconductor or conductor material, for example in the form of particles, is separated from the electrolyte solution. Separation methods are known to a person skilled in the art.

In one embodiment, the functionalised material is dried after separation.

In one embodiment, the functionalised material is dried and/or dispersed after separation.

The production of more highly concentrated and stable dispersions from the prior art has hitherto only been possible using additives, such as, for example, surfactants. With surfactants, almost any filler content of the dispersions in different solvents or media can be adjusted.

However, surfactants have a negative effect on interactions with the matrix (for example in polymer composites) and reduce the conductivity and stability of the applied semiconductor or conductor layers, for example in print applications. The surfactants have to be subsequently washed out or thermally removed in a complex process. This complicates processing and is also extremely costly and energy intensive.

Furthermore, dispersion in solvents which are less ecologically and economically advantageous, such as DMF or NMP, has hitherto been known.

The dispersion of the material functionalised according to the invention is advantageously possible not only in organic, water-free solvents, but in particular also in water or aqueous solvents without the addition of surfactants, which means that improved environmental sustainability and lower costs are possible.

Within the context of the invention, aqueous solvents are homogeneous solvents which also contain a proportion of water.

Advantageously, dispersion is possible not only in water or aqueous solvents or organic solvents, but also in a wide range of reactants, for example polymerisation precursors, epoxides, silicones, without the use of additives such as surfactants.

The dispersions produced according to the invention are advantageously stable over a long period of time even without the addition of such additives. Contrary to all prior art, this stability can even be achieved only in water. The dispersions formed in this way can be processed easily, which is advantageous, for example, in the coating of substrates with the functionalised conductor or semiconductor material.

In one embodiment, dispersion is carried out in a solvent selected from water and/or alcohols.

In one embodiment, the solvent is aqueous and alcoholic, i.e. it contains a mixture of water and alcohol.

In one embodiment, the water/alcohol volume ratio is 0:100 to 100:0, preferably 99:1 to 1:99, particularly preferably 80:20 to 20:80.

In one embodiment, the alcohol comprises only one alcoholic component. In another embodiment, the alcohol comprises a number of different alcoholic components.

In one embodiment, the alcohol is selected from ethanol and/or ethylene glycol.

In one embodiment, the concentration of the functionalised material in aqueous and/or alcoholic dispersions is 0.1 to 100 g/l, preferably 0.1 to 10 g/l, particularly preferably 0.1 to 2 g/l, in particular 0.1 to 1 g/l.

Dispersions which are much more concentrated than previously known from the prior art are therefore advantageously realisable without the use of additives which modify the interfacial tension, such as, for example, surfactants.

For the first time, the functionalisation of the semiconductor or conductor material according to the invention makes it possible to process the material, for example on electrodes or substrates, from a wide variety of media.

For example, stable dispersions of graphene, which was functionalised according to the invention with polyaniline (EG-PANI), could be produced in high concentrations in water or ethylene glycol. It was also possible to produce dispersions of graphene (EG-SPANI) functionalised with sulphonated polyaniline in water, ethanol and ethylene glycol. Further examples are listed in Table 4.

TABLE 4

Examples of stable dispersions of different materials produced according to the invention in different media and different concentrations:

| Entry | Product | Solvent | Stable concentration (mg/ml) |
|---|---|---|---|
| 1a | EG-SPANI | Water | 0.4 to 2 |
| 1b | EG-SPANI | Water | 100* |
| 2a | EG-SPANI | Ethanol | 0.5 to 1 |
| 2b | EG-SPANI | Ethanol | 80* |
| 3 | EG-SPANI | Ethylene glycol | 1 |
| 4 | EG-SPANI | DMF | 1 |
| 5 | EG-PANI | Water | 0.1-0.2 |
| 6 | EG-PANI | Ethanol | 0.3-0.4 |
| 7 | EG-PANI | Ethylene glycol | 0.5-0.6 |
| 8 | EG-PPy | Water | 0.1-0.2 |
| 9 | EG-PPy | Ethanol | 0.3-0.4 |
| 10 | EG-PPy | Ethylene glycol | 0.5-0.6 |
| 11 | EG-PNIPAM | Water | 0.3-0.4 |
| 12 | EG-PSS | Water | 0.4 |
| 13 | EG-PAM | Water | 0.25 |

*Dispersion in paste form with a significantly higher viscosity than that of the basic solvent EG-SPANI=exfoliated graphene functionalised with sulphonated polyaniline,
EG-PANI=exfoliated graphene functionalised with polyaniline,
EG-PPy=exfoliated graphene functionalised with polypyrrole,
EG-PNIPAM=exfoliated graphene functionalised with poly(N-isopropylacrylamide),
EG-PSS=exfoliated graphene functionalised with poly(styrene sulphonate),
EG-PAM=exfoliated graphene functionalised with poly(methylene-bis-acrylamide).

In one embodiment, only the outer layer of the two-dimensional layered base material is exfoliated and functionalised, wherein the exfoliated and functionalised semiconductor or conductor material in the form of particles remains connected to the base material via a not completely exfoliated edge portion of the particles, so that the particles stand scale-like on the surface of the base material.

The functionalised semiconductor or conductor material is then separated from the electrolyte solution by removing it together with the base material from the electrolyte solution. A surface-functionalised base material is advantageously obtained.

The structural properties of the two-dimensional layered base material can thus advantageously be retained and the functionalised semiconductor or conductor material serves as surface functionalisation on the base material.

Examples of such an embodiment include functionalised graphite foils and functionalised carbon fibres, in which the functionalised material increases the surface of the base material. These can be used, for example, for applications as catalyst supports or for improving fibre-matrix interactions in carbon fibre-reinforced composites.

The invention also relates to the use of the functionalised semiconductor or conductor material produced according to the invention for producing a dispersion in inorganic and/or organic liquid media.

Within the context of the invention, inorganic and/or organic liquid media are understood to mean both pure solvents and those consisting of several components or monomers or silicones or mixtures thereof.

In one embodiment, the dispersion is free from compounds which modify the interfacial tension, such as surfactants, detergents or emulsifiers.

The invention also relates to the use of the functionalised semiconductor or conductor material produced according to the invention for producing a dispersion in aqueous and/or alcoholic solution.

The conductor or semiconductor material produced according to the invention advantageously has a particularly low defect density. RAMAN measurements show that the functionalisation of exfoliated material with small organic molecules or polymers protects the surface of the base material from oxygen radicals during the exfoliation. This is evident from the particularly low $I_D$-$I_G$ ratios.

For example, EG-PANI produced according to the invention has an $I_D$-$I_G$ ratio of 0.12 or EG-PPy produced according to the invention has an $I_D$-$I_G$ ratio of 0.13.

The invention also relates to the use of a functionalised semiconductor or conductor material produced by the method according to the invention in electronic components.

The invention also relates to the use of a functionalised semiconductor or conductor material produced by the method according to the invention as an electrode material, for example in batteries or accumulators.

The invention also relates to the use of a functionalised semiconductor or conductor material produced according to the invention as a filler in resins and polymer solutions, such as lacquers, paints, adhesives and similar liquid formulations, such as lubricants.

The invention also relates to the use of a functionalised semiconductor or conductor material produced according to the invention as a filler in composites such as polymer composites, metal matrix composites, ceramic composites and similar solid formulations, for example in the form of masterbatches.

In order to implement the invention, it is also expedient to combine the above-described designs of the invention, as well as the embodiments and features of the claims in an expedient manner.

The following embodiments are intended to explain the invention in more detail, but without restricting it thereto:

EMBODIMENTS

The present invention is described in more detail by the following drawings and embodiments, without this being intended to limit the breadth of the previously defined claims:

FIG. 1: Schematic illustration of in situ exfoliation and functionalisation of graphite, FIG. 2: Proposed mechanism of in situ functionalisation, FIG. 3: RAMAN spectra of a) EG and b) PPy-functionalised EG, FIG. 4: a) XPS overview spectra of EG and EG-PPy, b) high-resolution XPS spectrum of the C1s region of EG, c) high-resolution XPS spectrum of the C1s region of EG-PPY and d) high-resolution XPS spectrum of the N1s region of EG-PPY, FIG. 5: RAMAN spectrum of PANI-functionalised EG, FIG. 6: a) high-resolution XPS spectrum of the C1s region of EG-PANI and b) high-resolution XPS spectrum of the N1s region of EG-PANI, FIGS. 7: a) TGA, b) AFM and c) RAMAN analyses of SPANI-functionalised EG (EG-SPANI), FIG. 8: XPS analysis by EG-SPANI: a) overview spectrum and high-resolution XPS spectra of b) the C1s region, c) the S2p region and d) the N1s region, FIG. 9: Schematic illustration of the mass production of EG-SPANI (=exfoliated graphene functionalised with sulphonated polyaniline) by a continuous system, FIG. 10: a) TGA and b) AFM analyses of PNIPAM-functionalised EG (EG-PNIPAM), FIG. 11: XPS analysis of EG-PNIPAM a) overview spectrum and b) high-resolution spectrum of the N1s region, FIG. 12: TGA analyses of a) EG functionalised with poly(methylene-bis-acrylamide) (PAM) b) EG functionalised with sulphonated polystyrene, FIGS. 13: a) TGA, b) XPS overview spectrum and c) XPS N1s region analyses of a butylamine-functionalised EG d) increased degree of butylamine functionalisation detected by TGA, FIGS. 14: a) TGA and b) XPS spectra of, using valeric acid, pentyl-functionalised EG, FIG. 15: Proposed mechanism for direct post-functionalisation of EG immediately after the exfoliation, FIGS. 16: a, b) RAMAN and c) TGA spectra of polypyrrole-functionalised EG using direct post-functionalisation, FIG. 17: XPS analysis of polypyrrole-functionalised EG using direct post-functionalisation, a) overview spectrum, b) C1s region and c) N1s region, FIG. 18: TGA analysis of EG after direct post-functionalisation with a) valeric acid, b) butylamine and tert-Octylamine, FIG. 19: Zeta potential measurements of aqueous dispersions of functionalised graphenes, FIG. 20: Charge and discharge curve of a half-cell lithium-ion battery with LiCoO$_2$/EG-SPANI (90/10) as the cathode material, FIG. 21: Cyclic voltammetry measurements of 3-electrode supercapacitors with a free-standing film of functionalised graphene (EG-SPANI) as an electrode.

CHARACTERISATION OF THE MATERIALS PRODUCED

SEM images were obtained using a field emission scanning electron microscope (Gemini 1530 LEO) with an accelerating voltage of 10 keV. AFM characterisation was carried out on a Veeco Nanoskop-IIIa—MultiMode Pico-Force (Digital Instruments). Raman spectroscopy and mapping were carried out with a Bruker RFS 100/S spectrometer (laser wavelength 532 nm). The XPS analyses were carried out on a Thermo Scientific K-Alpha X-ray photoelectron spectrometer with a basic chamber pressure of between ~$10^{-8}$-$10^{-9}$ mbar and an Al anode as X-ray source (X-ray radiation of 1496 eV). Spot sizes of 400 µm were used. Overview spectra were recorded with an average of 10 scans, a transmission energy of 200.00 eV and a step size of 1 eV. High-resolution spectra were recorded with an average of 10 scans with a transmission energy of 50.00 eV and a step size of 0.1 eV. The sheet resistances of the EG films were measured with a four-point resistance measuring system using a Keithley 2700 Multimeter (probe spacing: 0.635 mm, Rs=4.532 V/I).

Embodiment 1

Electrochemical Exfoliation and In Situ Functionalisation of Graphite with Polypyrrole and Production of a Dispersion of Polypyrrole-Functionalised Graphene (EG-PPy)

The graphite exfoliation was carried out in a two-electrode system, wherein graphite foils (2 cm×3 cm, 100 mg per foil) (Alfa Aesar, 99.99% purity) were used as working anodes and gold foils of the same dimensions were used as cathodes. The gold electrodes were arranged parallel to the graphite electrodes with a fixed distance of 2 cm. The electrolyte for the exfoliation was prepared by dissolving ammonium sulphate (0.1 M, 0.8 g) in 60 ml deionised water. Pyrrole (7 µl, "Reagent Grade", 98% purity) was dissolved in 10 ml water to obtain a 0.01 M monomer solution. After the electrodes were immersed in the electrolyte (6 cm$^2$ active electrode area in the solution), a constant potential of 10 V was applied to start the exfoliation process, at the same time the monomer solution was added at a rate of 20 ml/h using a syringe pump.

After the exfoliation was complete and the graphite foil had been consumed, the suspended graphene flakes were separated using a 0.2 µm PC (polycarbonate) filter and washed with deionised water. The washing process was repeated three times (3×400 ml) to wash out any residues such as ammonium sulphate and pyrrole monomers. The light grey product (polypyrrole-functionalised graphene, EG-PPY, 60 mg) was then dispersed in deionised water (30 ml) using mild ultrasound treatment (30 min ultrasound bath). This dispersion was left to stand for 24 hours in order to allow non-exfoliated, non-functionalised platelets and larger particles to sediment. The supernatant dispersion was then removed. The aqueous dispersion obtained in this way contained graphene in a concentration of 0.1-0.2 mg/ml and was stable for one week, i.e. there was no sedimentation of the particles.

For dispersions in other solvents, the product (polypyrrole-functionalised graphene, EG-PPY, 60 mg) was dispersed after washing with water in, for example, ethanol or ethylene glycol (30 ml in each case) using mild ultrasound treatment and left to stand for 24 hours. The supernatants obtained in this way yielded stable dispersions with a graphene content of 0.2-0.3 mg/ml (ethanol) and 0.5-0.6 g/ml (ethylene glycol).

The reaction was scaled up by using thicker graphite foils while maintaining the electrode area in the electrolyte and with an increased pyrrole concentration (in constant proportion to the weight of the graphite electrode).

Successful functionalisation could be demonstrated using X-ray photoelectron spectroscopy (XPS). The oxygen content was 11.46 atom % for EG and 9.52 atom % for EG-PPy.

Figure 4A:
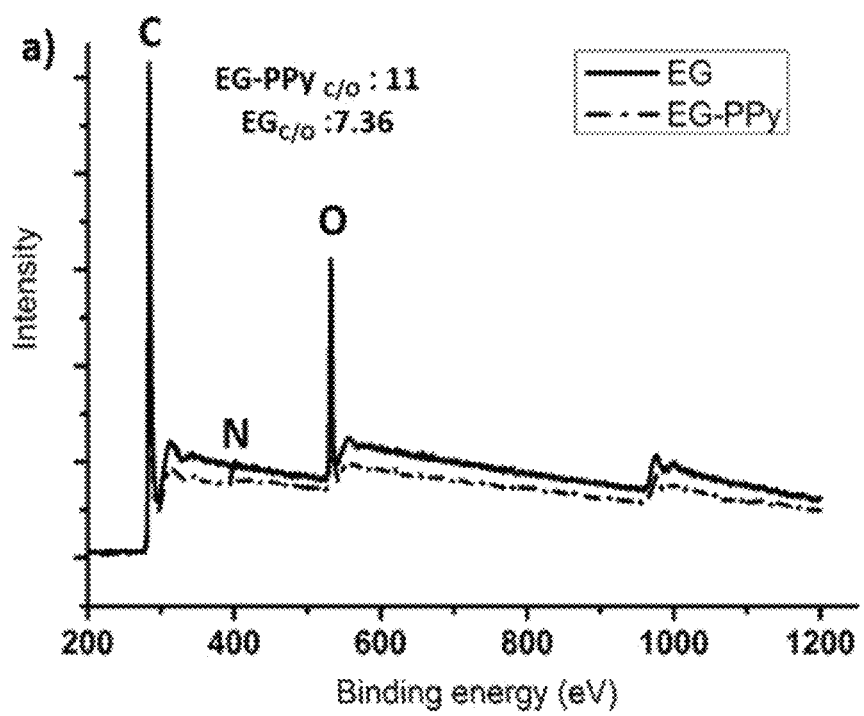

In the case of EG-PPy, in contrast to EG, nitrogen was also detected in a concentration of 2.79 atom %, which can be attributed to the polypyrrole groups (FIG. 4a).

The high-resolution spectrum of the N1s region (FIG. 4d) shows a main band at 400 eV which can be attributed to the —NH groups as well as a band at 401 eV which can be attributed to the polaron structure (C—N$^+$) of polypyrrole.

The high-resolution spectrum of the C1s region (FIG. 4c) shows three main bands at 284.35 eV, 285.4 eV and 287.2 eV, which can be attributed to the C=C, C—OH and C=O bonds.

Figure 4B:
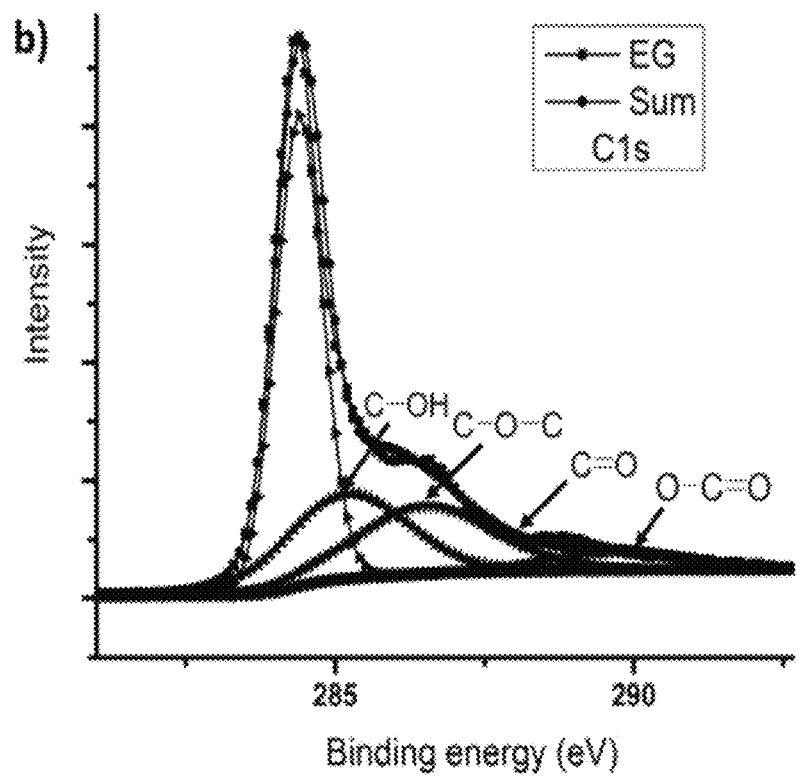
Figure 4C:
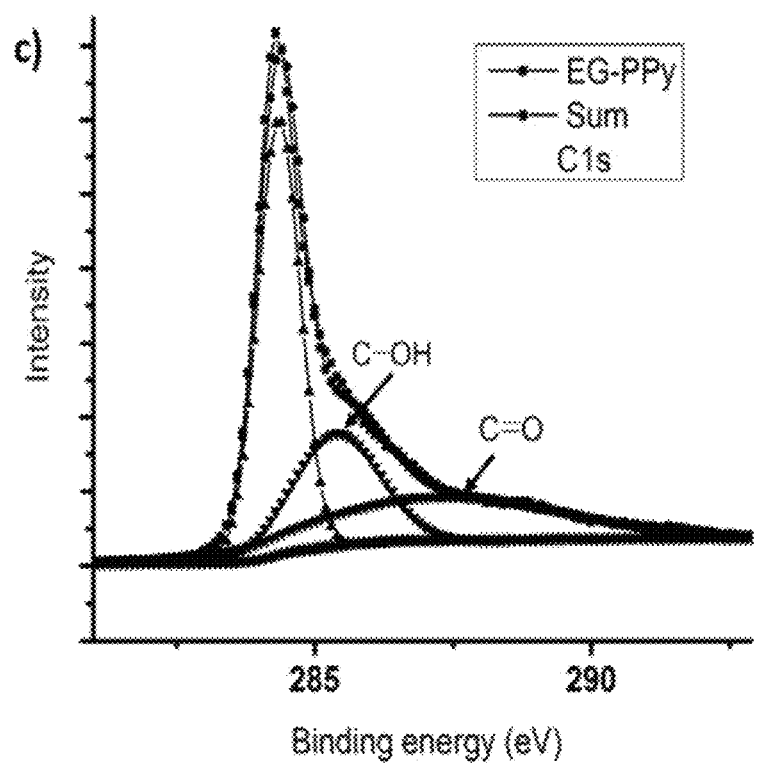
Figure 4D:
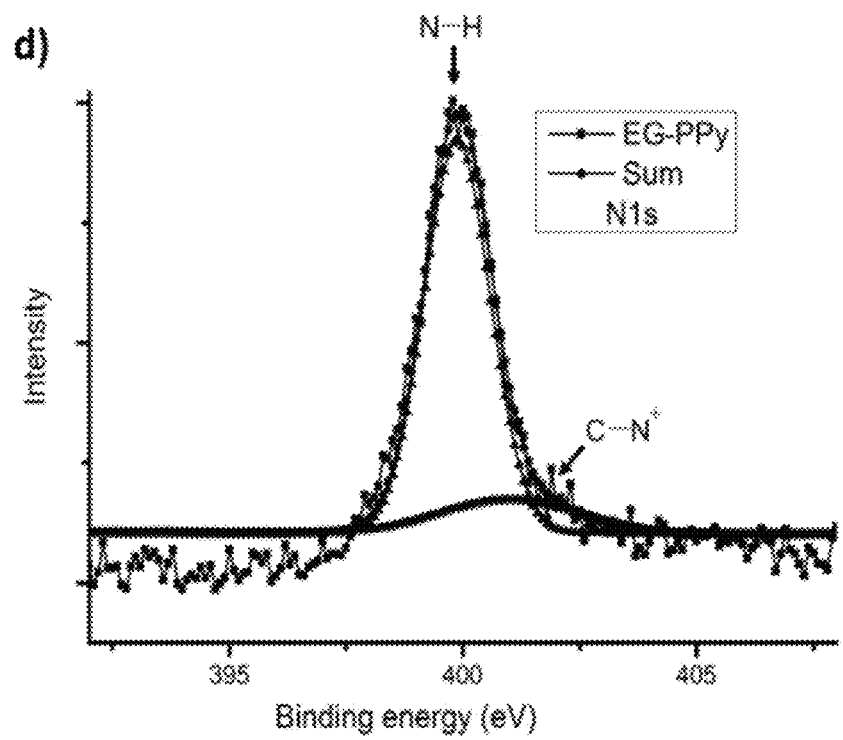

In contrast, unfunctionalised EG shows five different bands (FIG. 4b). In addition to the bands at 284.4 eV, 285.2 eV and 287.2 eV (C=C, C—OH and C=O bonds), two further bands occur at 286.5 eV and 290.2 eV, which are attributed to epoxy (C—O—C) and carboxylate groups (O—C=O) (FIG. 4b). The absence of epoxy groups in the case of functionalised EG shows that graphene undergoes less oxidation during the exfoliation, which is attributed to a protective effect of PPy functionalisation of the basal plane.

Figure 3A:
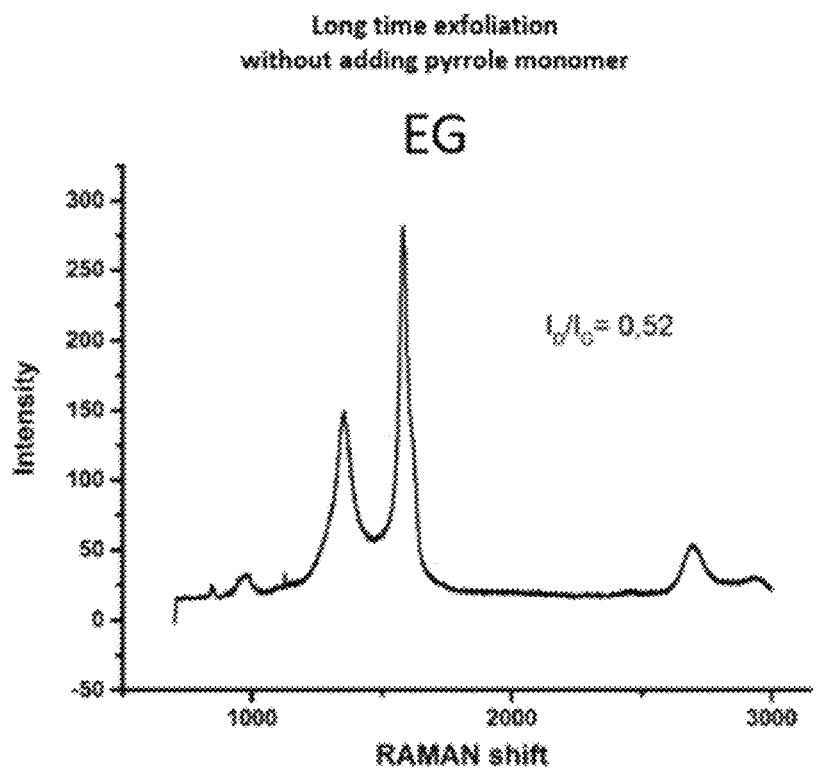
Figure 3B:
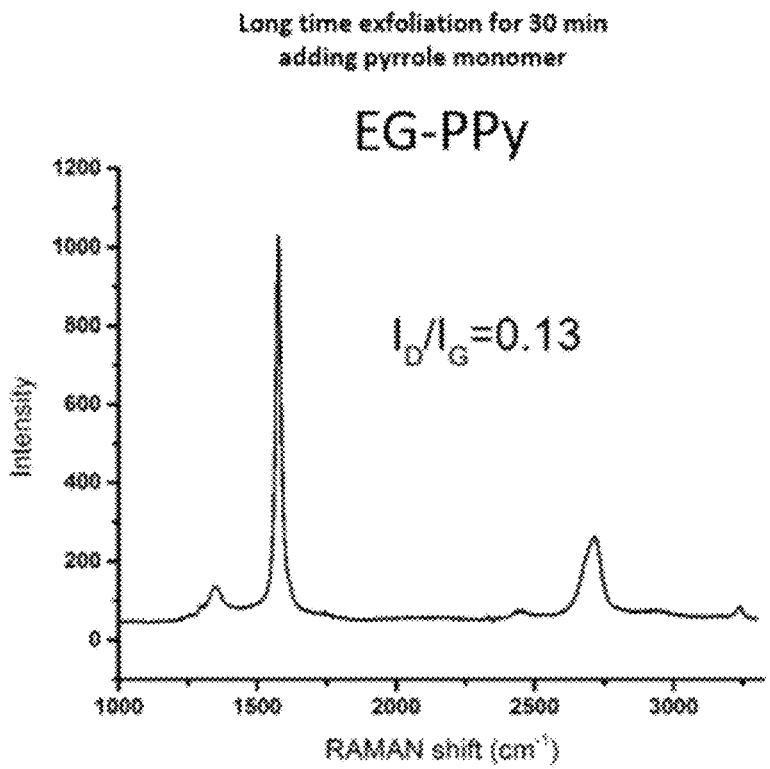

The high quality of functionalised graphene can be illustrated using RAMAN spectroscopy. While a relatively high intensity ratio of the D and G peaks of 0.52 (FIG. 3a) in the spectrum of EG indicates a considerable degree of defect sites (due to the attack of hydroxyl radicals on the exposed graphene surfaces), by adding the 0.01 M aqueous pyrrole solution during the exfoliation, the graphene surface can be protected by the polypyrrole functionalities formed, which is illustrated by a low $I_D$-$I_G$ ratio of 0.13 (FIG. 3b).

A thin film of EG-PPy was made by filtering a dispersion on a PC filter paper. The sheet resistance of the film was determined using a four-point resistance measuring system and the layer thickness using SEM, from which a conductivity of approximately 500 S/cm was determined.

Figure 19:
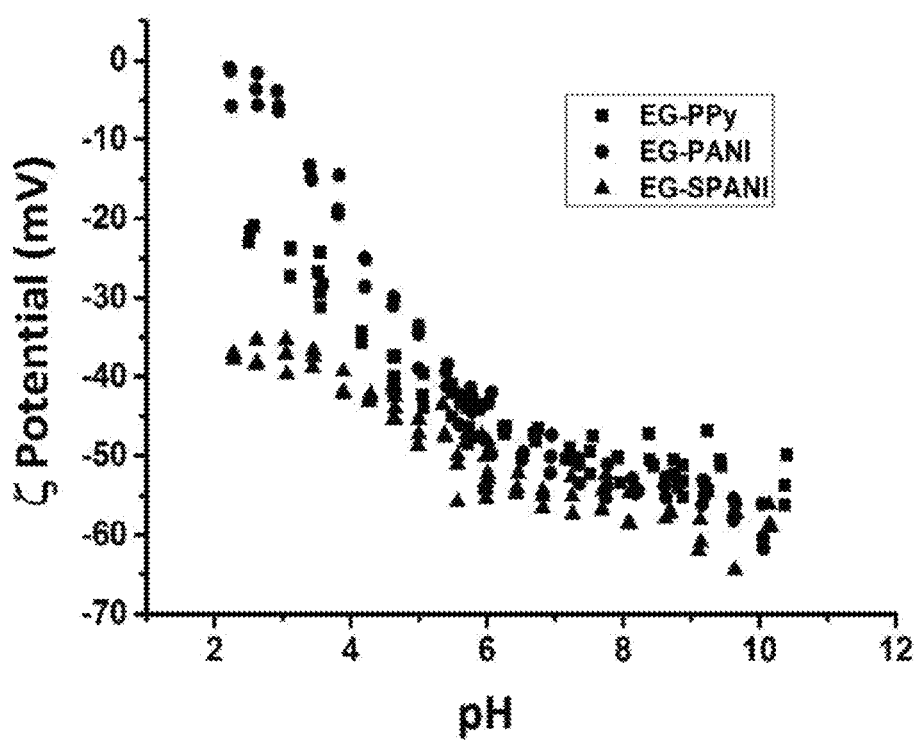

Zeta potential measurements of aqueous dispersions showed the stability of EG-PPy dispersions over a wide pH range (FIG. 19).

Embodiment 2

Electrochemical Exfoliation and In Situ Functionalisation of Graphite with Polyaniline and Production of a Dispersion of Polyaniline-Functionalised Graphene (EG-PANI)

The graphite exfoliation was carried out in a two-electrode system, wherein graphite foils (2 cm×3 cm, 100 mg per foil) (Alfa Aesar, 99.99% purity) were used as working anodes and gold foils of the same dimensions were used as cathodes. The gold electrodes were arranged parallel to the graphite electrodes with a fixed distance of 2 cm. The electrolyte for the exfoliation was prepared by dissolving ammonium sulphate (0.1 M, 0.8 g) in 60 ml deionised water. Aniline (10 µl, Acros Organics, 99.8% purity) was dissolved in 26 µl $H_2SO_4$ and 10 ml water to obtain a 0.01 M monomer solution. After the electrodes were immersed in the electrolyte (6 cm$^2$ active electrode area in the solution), a constant potential of 10 V was applied to start the exfoliation process, at the same time the monomer solution was added at a rate of 15 ml/h using a syringe pump.

After the exfoliation was complete and the graphite foil had been consumed, the suspended graphene flakes were separated using a 0.2 µm PC (polycarbonate) filter and washed with deionised water. The washing process was repeated three times (3×400 ml) to wash out any residues such as ammonium sulphate and aniline monomers. The light grey product (polyaniline-functionalised graphene, EG-PANI, 60 mg) was then dispersed in deionised water (30 ml) using mild ultrasound treatment (30 min ultrasound bath). This dispersion was left to stand for 24 hours in order to allow non-exfoliated, non-functionalised platelets and larger particles to sediment. The supernatant was then removed. The aqueous dispersion obtained in this way contained graphene in a concentration of 0.1-0.2 mg/ml and was stable for one week.

For dispersions in other solvents, the product (polyaniline-functionalised graphene, EG-PANI, 60 mg) was dispersed after washing with water, for example, in ethanol or ethylene glycol (30 ml in each case) using mild ultrasound treatment and left to stand for 24 hours. The supernatants obtained in this way yielded stable dispersions with a graphene content of 0.2-0.3 mg/ml (ethanol) and 0.5-0.6 g/ml (ethylene glycol).

The reaction was scaled up by using thicker graphite foils while maintaining the electrode area in the electrolyte and with increased aniline concentration (in constant proportion to the weight of the graphite electrode).

Successful functionalisation could be demonstrated using X-ray photoelectron spectroscopy (XPS).

Figure 6A:
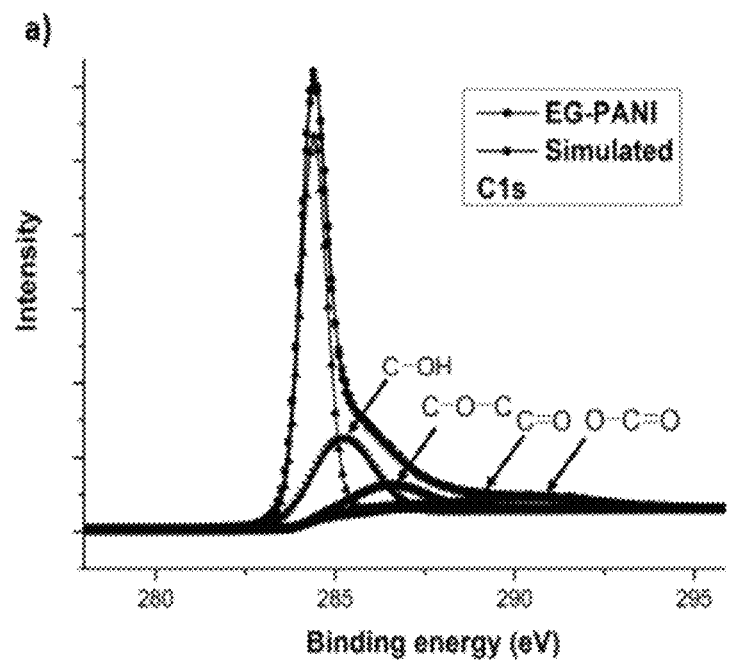
Figure 6B:
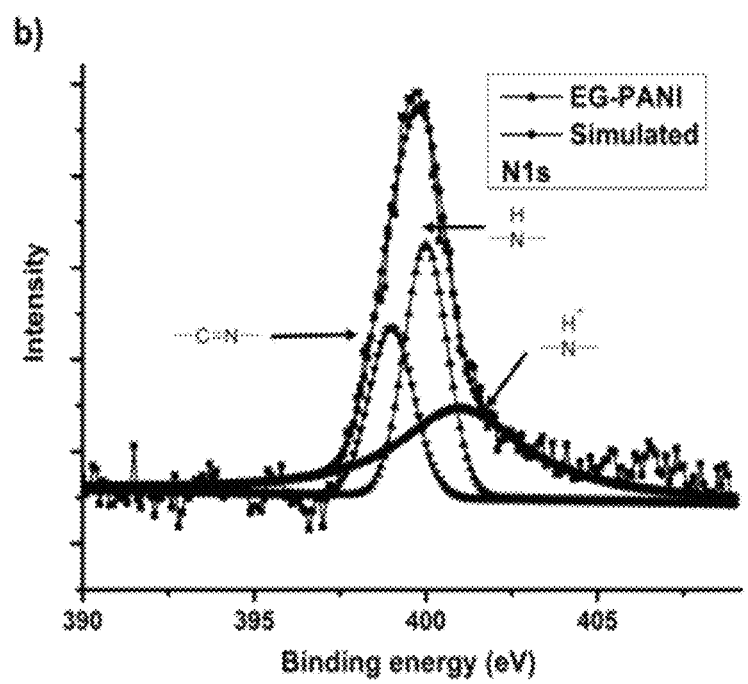

The oxygen content was 11.46 atom % for EG and 6.68 atom % for EG-PANI. In the case of EG-PANI, in contrast to EG, nitrogen was also detected in a concentration of 2.02 atom %, which can be attributed to the polyaniline groups (FIG. 6a, 6b).

The high-resolution spectrum of the N1s region (FIG. 6b) shows three bands at 399 eV, 400 eV and 401 eV which can be attributed to the C=N, —NH and —NH$^+$ groups of polyaniline.

The high-resolution spectrum of the C1s region (FIG. 6a) shows three main bands at 284.4 eV, 285.2 eV and 286.5 eV, which can be attributed to the C=C, C—OH and C=O bonds, while the proportion of epoxy groups is low.

Figure 5:
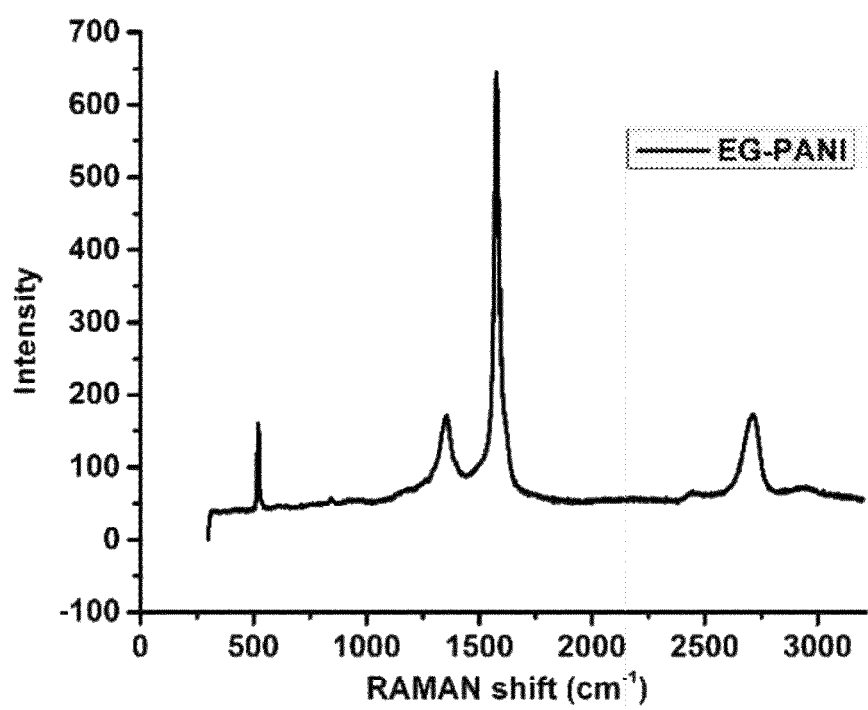

The high quality and low defect density of functionalised graphene can be illustrated using RAMAN spectroscopy. By adding the 0.01 M aqueous aniline solution during the exfoliation, the graphene surface can be protected by the polyaniline functionalities formed, which is illustrated by a low $I_D$-$I_G$ ratio of 0.12 (FIG. 5).

A thin film of EG-PANI was made by filtering a dispersion on a PC filter paper. The sheet resistance of the film was determined using a four-point resistance measuring system and the layer thickness using SEM, from which a conductivity of approximately 400 S/cm was determined.

Zeta potential measurements of aqueous dispersions showed the stability of EG-PANI dispersions in the neutral pH range and low stability under acidic conditions (FIG. 19).

Embodiment 3

Electrochemical Exfoliation and In Situ Functionalisation of Graphite with Sulphonated Polyaniline and Production of a Dispersion of EG-SPANI (=Exfoliated Graphene Functionalised with Sulphonated Polyaniline)

The graphite exfoliation was carried out in a two-electrode system, wherein graphite foils (2 cm×3 cm, 100 mg per foil) (Alfa Aesar, 99.99% purity) were used as working anodes and gold foils of the same dimensions were used as cathodes. The gold electrodes were arranged parallel to the graphite electrodes with a fixed distance of 2 cm. The electrolyte for the exfoliation was prepared by dissolving ammonium sulphate (0.1 M, 0.8 g) in 60 ml deionised water. Aniline sulphonic acid (18 mg, Sigma-Aldrich, 95% purity) was dissolved in 26 µl $H_2SO_4$ and 10 ml water to obtain a 0.01 M monomer solution. After the electrodes were immersed in the electrolyte (6 $cm^2$ active electrode area in the solution), a constant potential of 10 V was applied to start the exfoliation process, at the same time the monomer solution was added at a rate of 15 ml/h using a syringe pump.

After the exfoliation was complete and the graphite foil had been consumed, the suspended graphene flakes were separated using a 0.2 µm PC (polycarbonate) filter and washed with deionised water. The washing process was repeated three times (3×400 ml) to wash out any residues such as ammonium sulphate and aniline monomers. The dark grey product (polyaniline sulphonate-functionalised graphene, EG-SPANI, 60 mg) was then dispersed in deionised water (30 ml) using mild ultrasound treatment (30 min ultrasound bath). This dispersion was left to stand for 24 hours in order to allow non-exfoliated, non-functionalised platelets and larger particles to sediment. The supernatant dispersion was then removed. The aqueous dispersion obtained in this way contained graphene in a concentration of 0.3-0.4 mg/ml and was stable for one week.

For dispersions in other solvents, the product (polyaniline sulphonate-functionalised graphene, EG-SPANI, 60 mg) was dispersed after washing with water, for example, in ethanol or ethylene glycol (30 ml in each case) using mild ultrasound treatment and left to stand for 24 hours. The supernatants obtained in this way yielded stable dispersions with a graphene content of 0.4-0.5 mg/ml (ethanol) and 0.8-1.0 g/ml (ethylene glycol).

The reaction was scaled up by using thicker graphite foils while maintaining the electrode area in the electrolyte and with increased aniline concentration (in constant proportion to the weight of the graphite electrode).

Figure 7A:
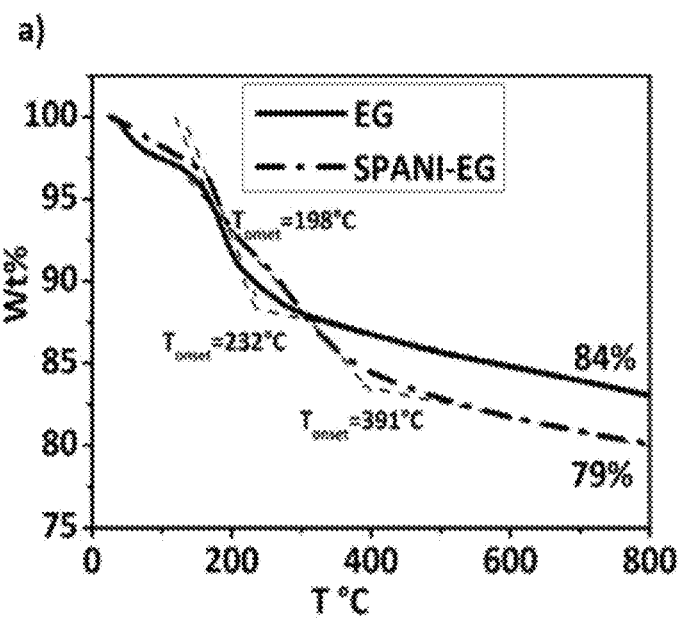

Successful functionalisation could be demonstrated by thermogravimetry (TGA), where the functionalised EG-SPANI showed an almost 5 wt. % higher loss of mass compared to unfunctionalised EG (FIG. 7a).

Figure 7B:
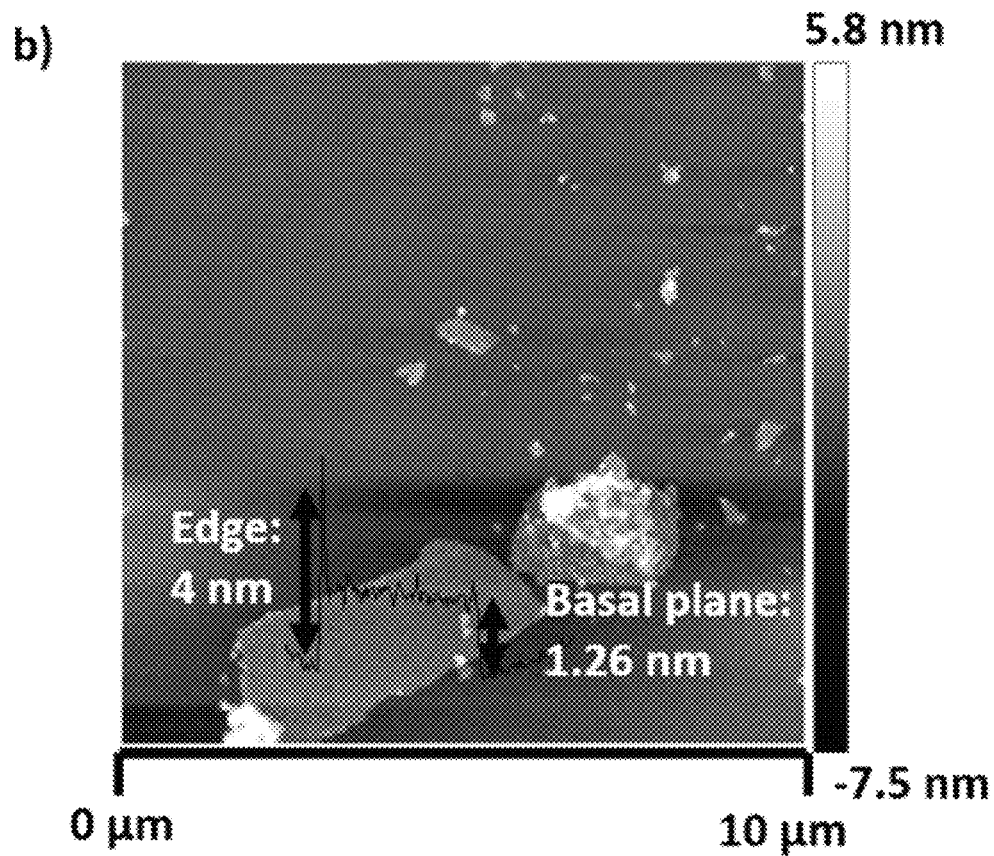
Figure 7C:
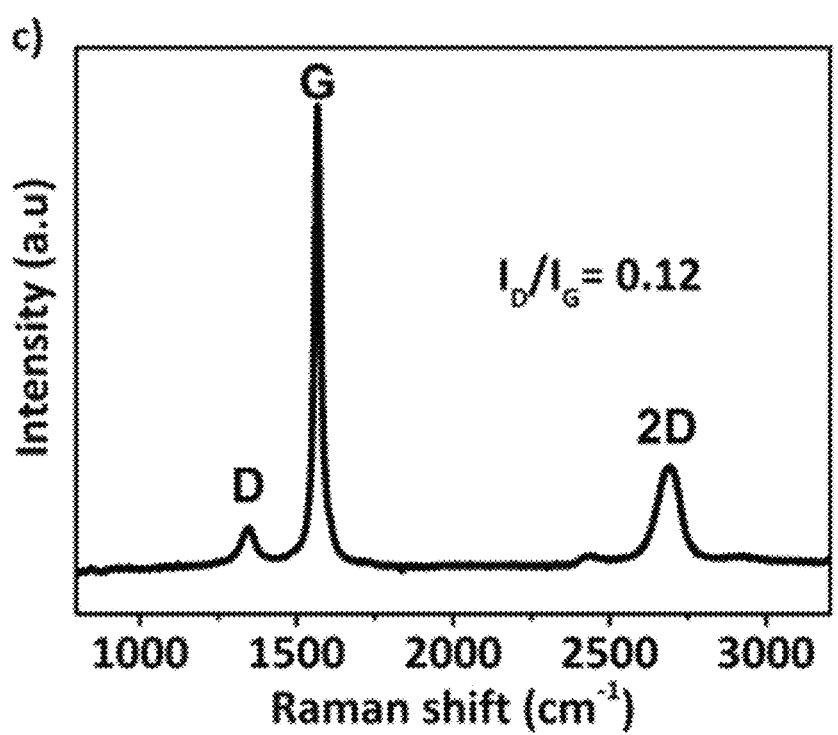

The AFM investigations showed a layer thickness of 4 nm and 1.2 nm for the edges and basal planes of the platelets (FIG. 7b). RAMAN measurements showed a low $I_D/I_G$ ratio of 0.12 and thus a low defect density (FIG. 7c).

Figure 8A:
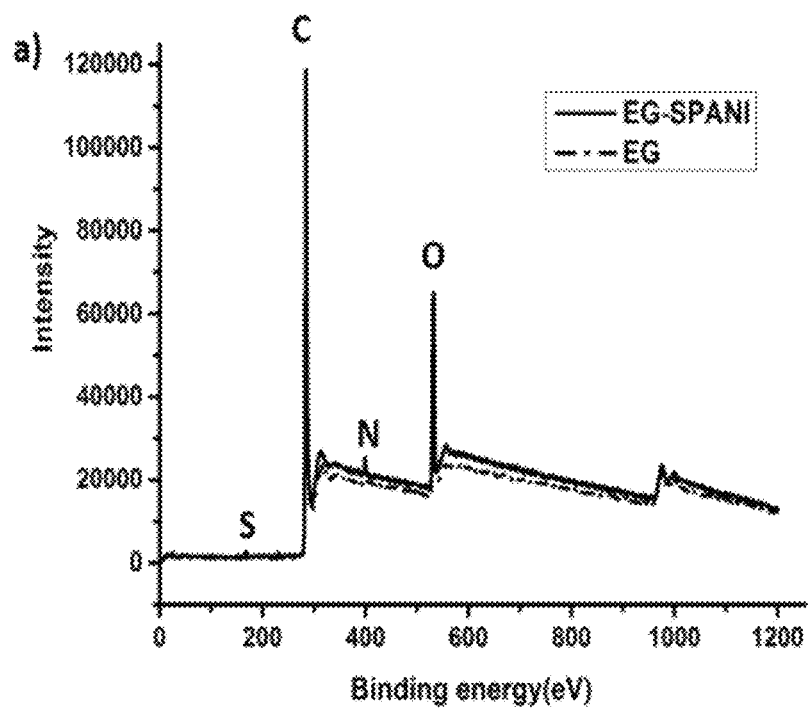
Figure 8B:
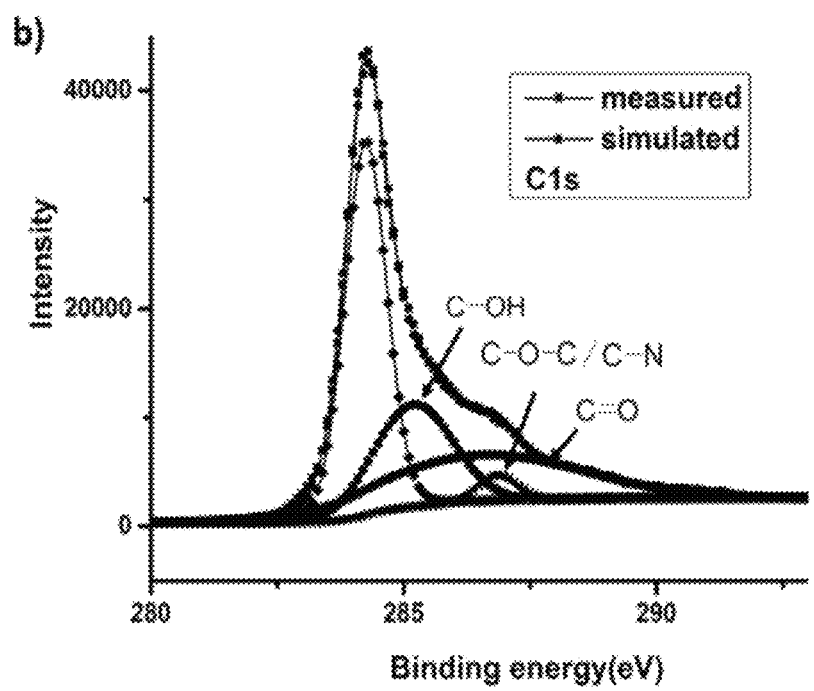
Figure 8C:
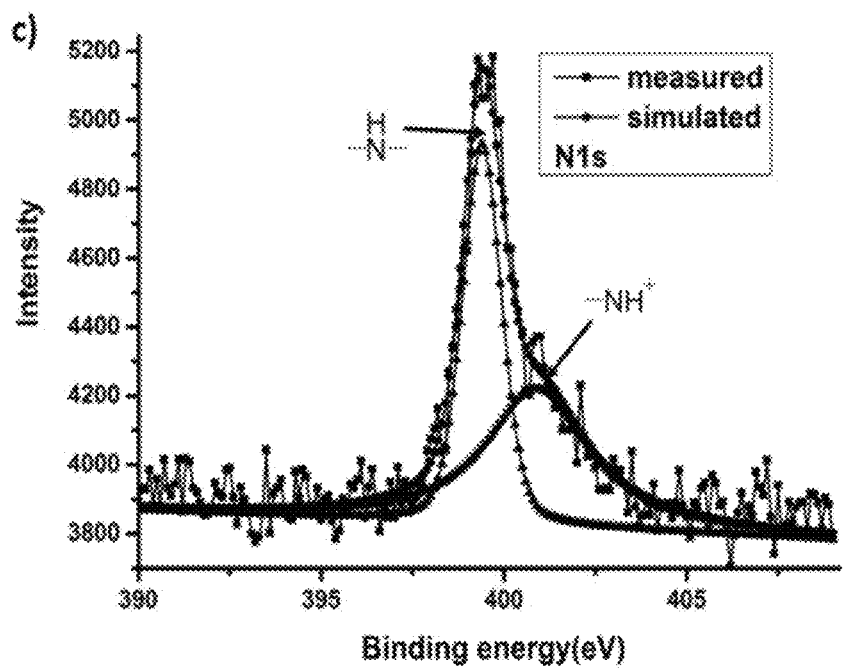
Figure 8D:
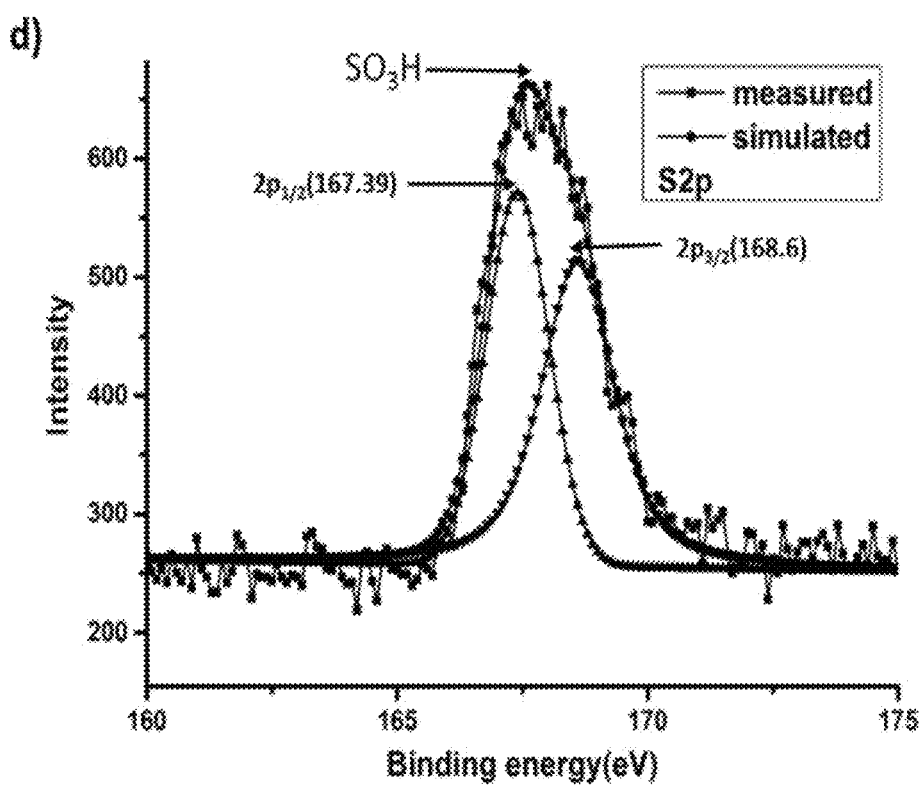

X-ray photoelectron spectroscopy (XPS) showed a nitrogen content of 2.15 atom % and a sulphur content of 0.62 atom %, which can be attributed to the polyaniline sulphonate groups (FIG. 8a).

The high-resolution spectrum of the N1s region shows a main band at 400 eV which can be attributed to the —NH groups as well as the band at 401 eV which can be attributed to the polaron structure (C—$N^+$) of polyaniline sulphonate. The high-resolution spectrum of the C1s region (FIG. 8b) shows three main bands at 284.35 eV, 285.4 eV and 287.2 eV, which can be attributed to the C=C, C—OH and C=O bonds. The high-resolution spectrum of the sulphur region (FIG. 8c) shows two bands at 167.4 eV and 168.6 eV, which can be attributed to the sulphonic acid or sulphonate groups of the polyaniline sulphonate.

A thin film of EG-SPANI was made by filtering a dispersion on a PC filter paper. The sheet resistance of the film was determined using a four-point resistance measuring system and the layer thickness using SEM, from which a conductivity of approximately 800 S/cm was determined.

Zeta potential measurements of aqueous dispersions showed the stability of EG-SPANI dispersions over a wide pH range (3-10) with a zeta potential of below −40 mV (FIG. 19).

Embodiment 4

Figure 9:
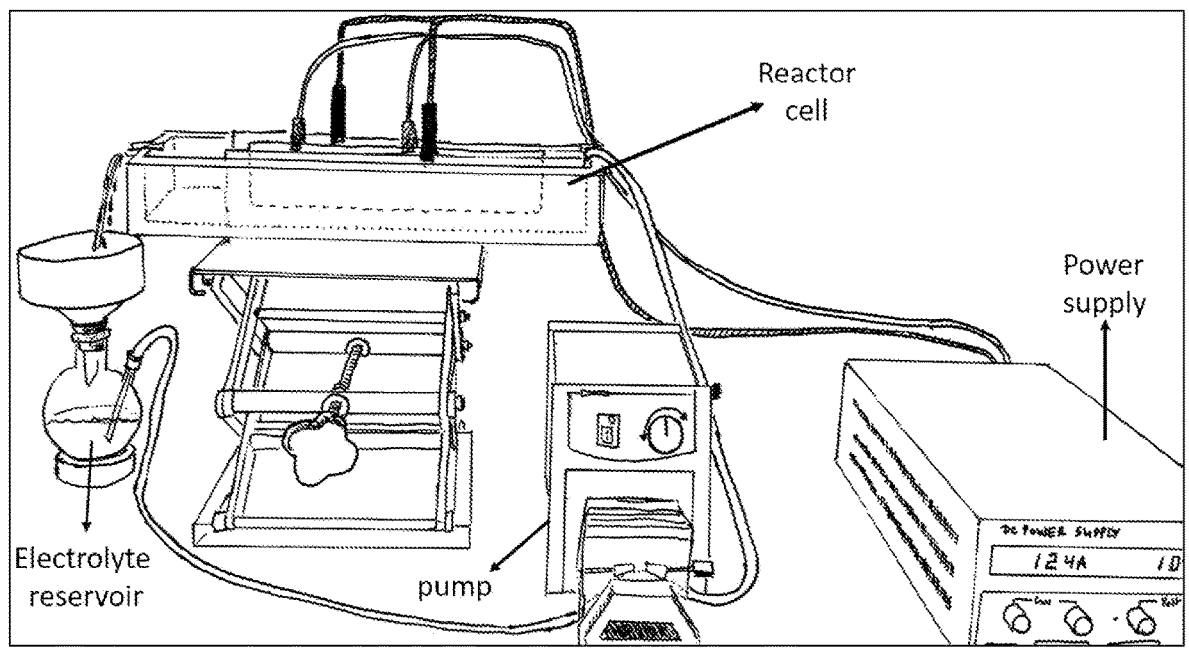

Mass Production of EG-SPANI (=Exfoliated Graphene Functionalised with Sulphonated Polyaniline) by a Continuous System The graphite exfoliation was carried out in a continuous system, wherein graphite foils (5 cm×30 cm, 2.3 mg per foil) (Alfa Aesar, 99.99% purity) were used as working anodes and copper foils of the same dimensions were used as cathodes. The copper electrodes were attached to the reactor wall, where the graphite electrodes were immersed in the electrolyte from above (FIG. 9). The electrolyte for the exfoliation was prepared by dissolving ammonium sulphate (0.1 M, 46.2 g), aniline sulphonic acid (1 g, Sigma-Aldrich, 95% purity) and 1.4 ml $H_2SO_4$ in 3.5 l deionised water and flows continuously through a pump into the system at constant speed. After the electrodes were immersed in the electrolyte (150 $cm^2$ active electrode area in the solution), a constant potential of 10 V was applied to start the exfoliation process and the polymerisation process.

After the exfoliation was complete and the graphite foil had been consumed, the suspended graphene flakes were separated using a 0.2 µm PC (polycarbonate) filter and washed with deionised water. The washing process was repeated three times (2 l) to wash out any residues such as ammonium sulphate and aniline monomers. The dark grey product (polyaniline sulphonate-functionalised graphene, EG-SPANI, 2.2 mg) was then dispersed in deionised water (150 ml) using mild ultrasound treatment (30 min, 30% amplitude, 2 watts). This dispersion was left to stand for 24 hours in order to allow non-exfoliated, non-functionalised platelets and larger particles to sediment. The supernatant dispersion was then removed. The aqueous dispersion obtained in this way contained graphene in a concentration of 0.5 mg/ml and was stable for several weeks.

Embodiment 5

Electrochemical Exfoliation and In Situ Functionalisation of Graphite with Poly-N-Isopropylacrylamide and Production of a Dispersion of EG-PNIPAM (=Poly-N-Isopropylacrylamide-Functionalised Graphene)

The graphite exfoliation was carried out in a two-electrode system, wherein graphite foils (2 cm×3 cm, 100 mg per foil) (Alfa Aesar, 99.99% purity) were used as working anodes and gold foils of the same dimensions were used as cathodes. The gold electrodes were arranged parallel to the graphite electrodes with a fixed distance of 2 cm. The electrolyte for the exfoliation was prepared by dissolving ammonium sulphate (0.1 M, 0.8 g) in 60 ml deionised water. N-isopropylacrylamide (30 mg, 0.25 mmol, Sigma, purity 97%) was dissolved in 10 ml water to obtain a 0.02 M monomer solution. After the electrodes were immersed in the electrolyte (6 $cm^2$ active electrode area in the electrolyte solution), a constant potential of 10 V was applied to start the exfoliation process, at the same time the monomer solution was added at a rate of 20 ml/h using a syringe pump.

After the exfoliation was complete and the graphite foil had been consumed, the suspended graphene flakes were separated using a 0.2 μm PC (polycarbonate) filter and washed with deionised water. The washing process was repeated three times (3×400 ml) to wash out any residues such as ammonium sulphate and aniline monomers. The dark grey product (poly-N-isopropylacrylamide-functionalised graphene, EG-PNIPAM, 60 mg) was then dispersed in deionised water (30 ml) using mild ultrasound treatment (30 min ultrasound bath). This dispersion was left to stand for 24 hours in order to allow non-exfoliated, non-functionalised platelets and larger particles to sediment. The supernatant dispersion was then removed. The aqueous dispersion obtained in this way contained functionalised graphene in a concentration of 0.3-0.4 mg/ml and was stable for one week.

Figure 10A:
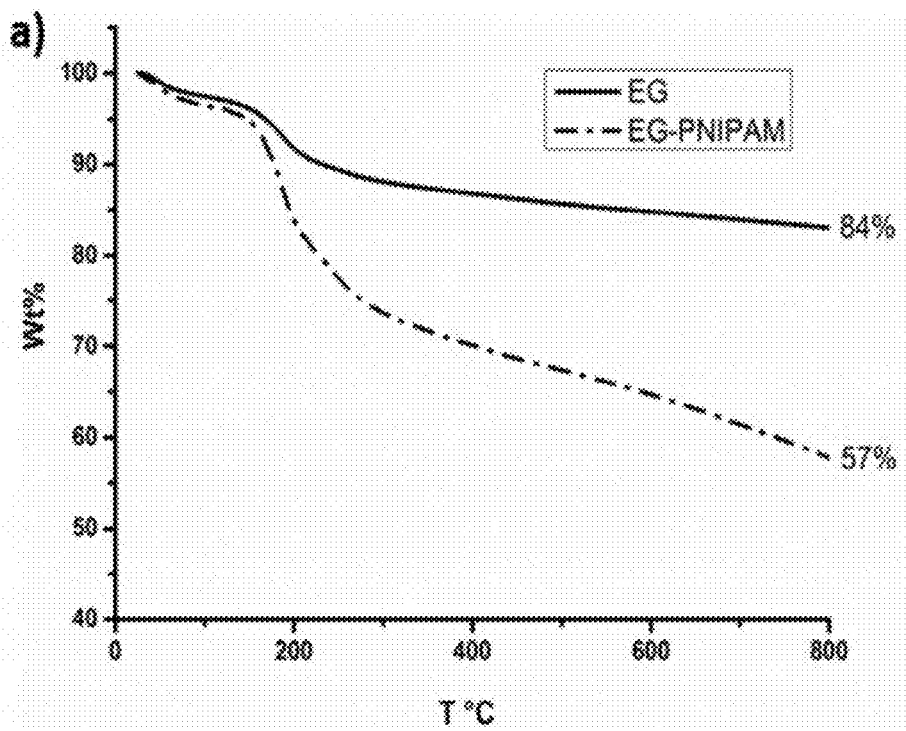

Successful functionalisation could be demonstrated by TGA, where the functionalised EG-PNIPAM showed a loss of mass of more than 40 wt. % compared to unfunctionalised EG (FIG. 10a).

Figure 10B:
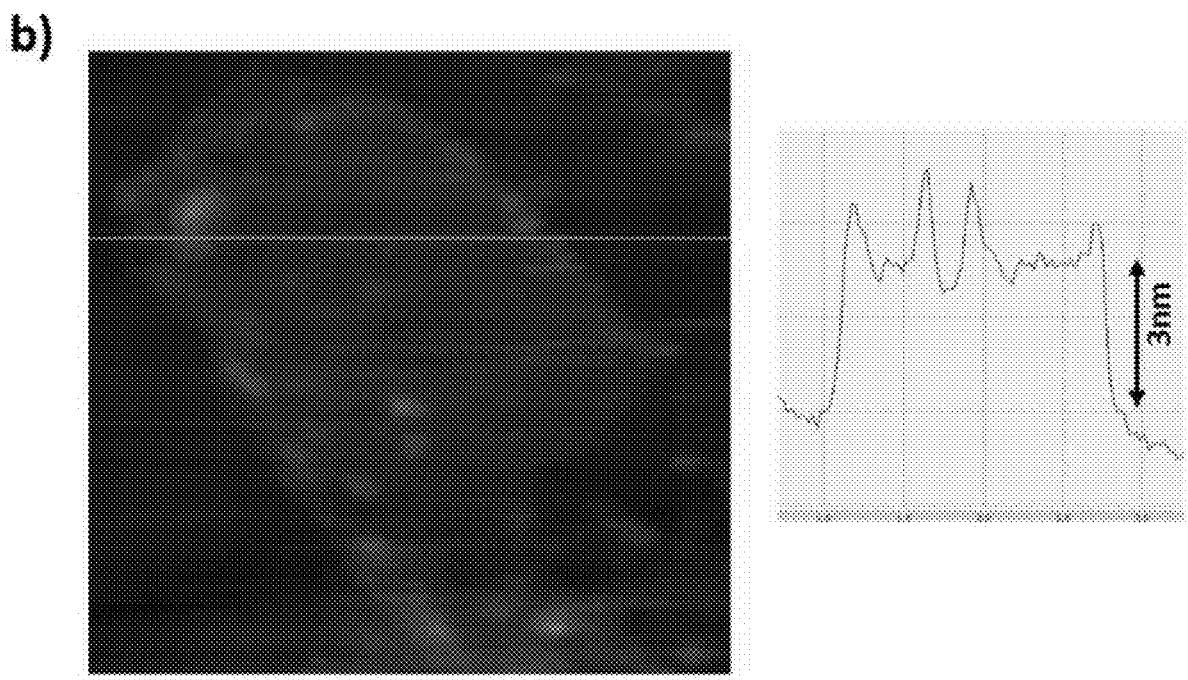

The AFM investigations showed a layer thickness of 3 nm, which shows the presence of functional groups on the surface (FIG. 10b).

Figure 11A:
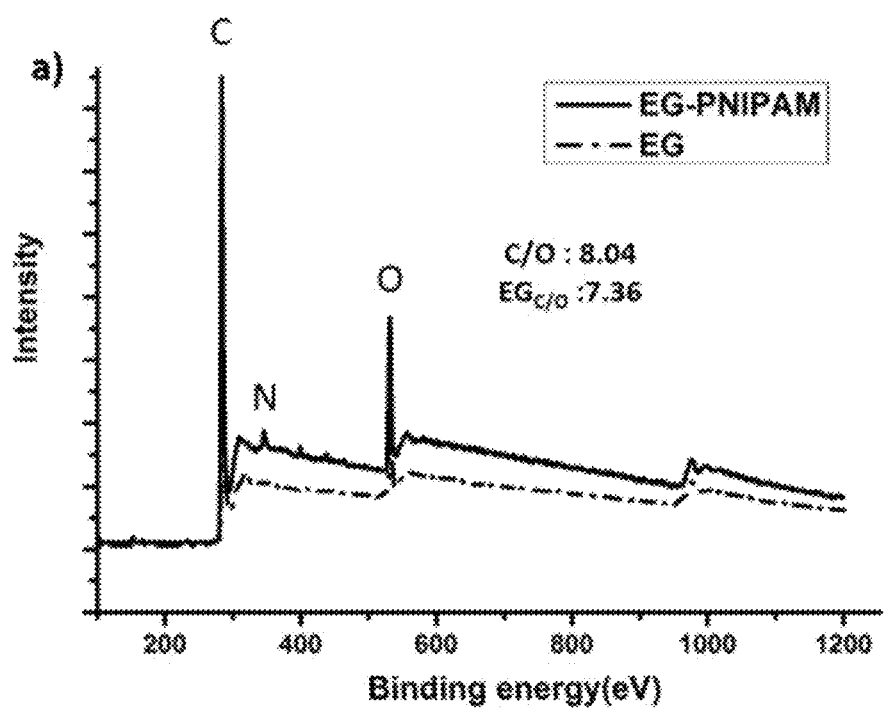
Figure 11B:
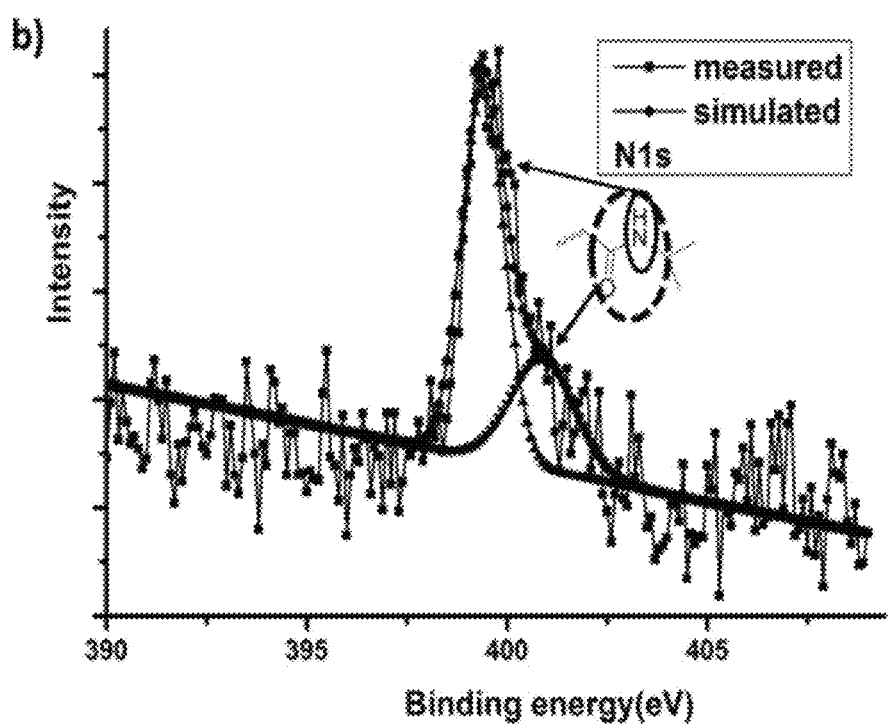

X-ray photoelectron spectroscopy (XPS) showed a nitrogen content of 0.86 atom % and an increase in the C/O ratio, which can be attributed to PNIPAM functionalisation (FIG. 11a). The high-resolution spectrum of the N1s region shows a main band at 400 eV which can be attributed to the —NH groups as well as the band at 401 eV which can be attributed to the amide structure of PNIPAM (FIG. 11b).

A thin film of EG-PNIPAM was made by filtering a dispersion on a PC filter paper. The relatively high sheet resistance of the film of ~140Ω/□ (determined with a four-point resistance measuring system) is due to the presence of the PNIPAM insulator on the graphene surface.

Figure 12A:
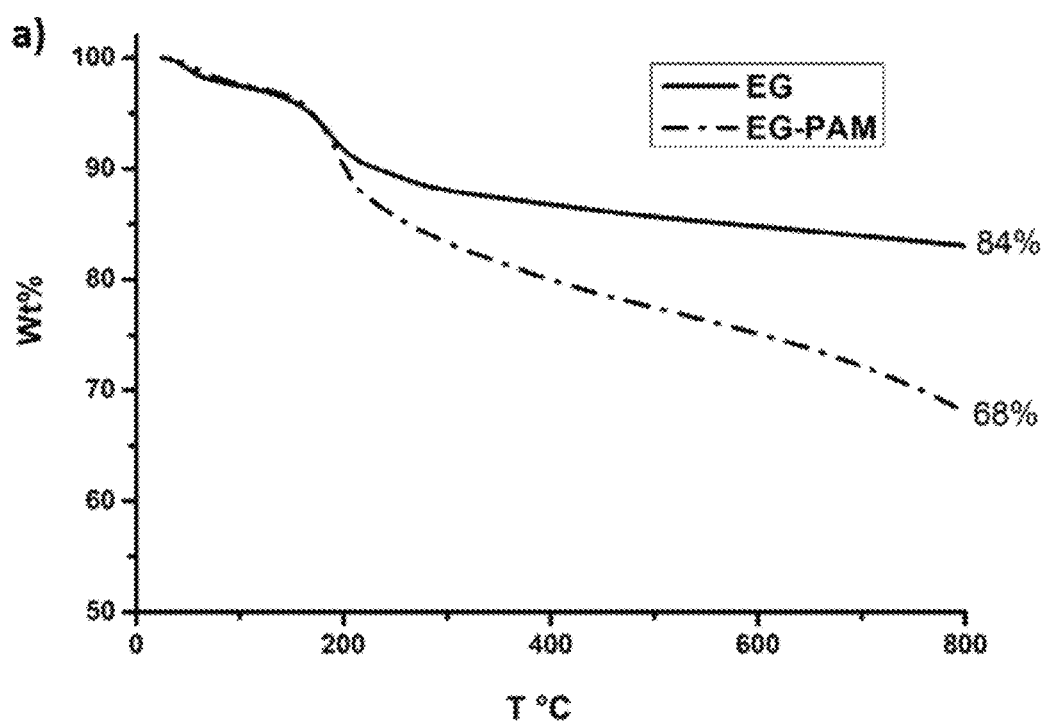
Figure 12B:
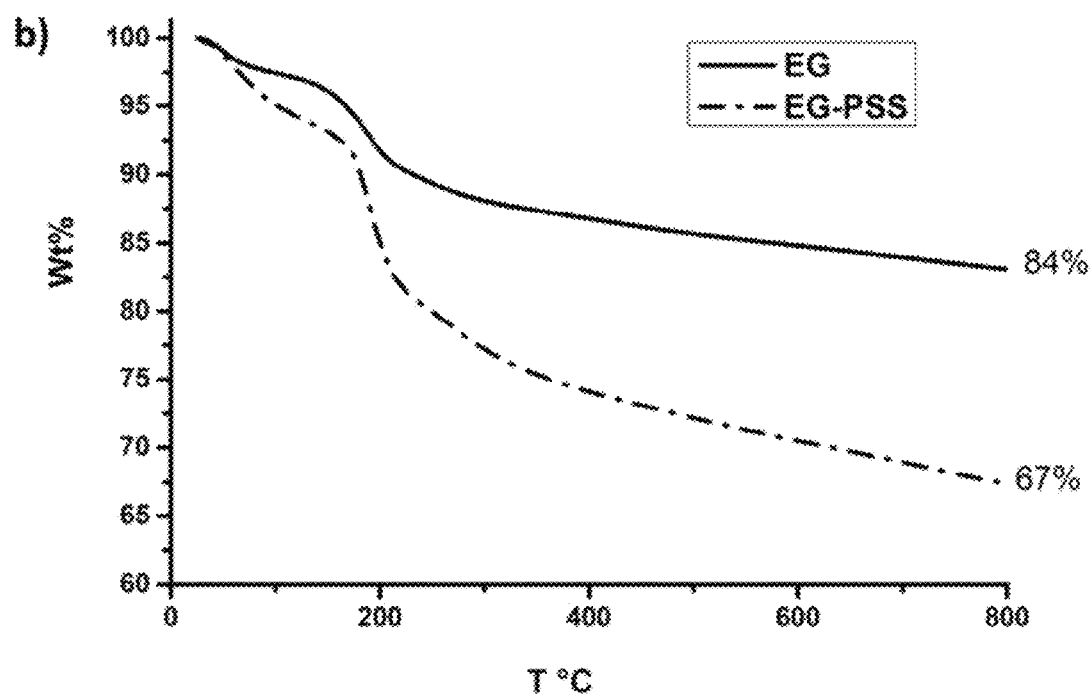

The method was carried out successfully in an analogous manner with other vinyl monomers, such as methylene-bis-acrylamide and sodium 4-vinylbenzenesulphonate, which could be polymerised on the surface of the graphene. Successful functionalisation with poly(methylene-bis-acrylamide) (PAM) and poly(sodium 4-vinylbenzenesulphonate) (PSS) was demonstrated analogously to example 4 by TGA (FIGS. 12a and 12b).

In addition, stable aqueous dispersions with EG-PAM (0.25 mg/ml) and EG-PSS (0.4 mg/ml) could be produced.

Embodiment 6

Electrochemical Exfoliation and In Situ Functionalisation of Graphite with Butylamine The graphite exfoliation was carried out in a two-electrode system, wherein graphite foils (2 cm×3 cm, 100 mg per foil) (Alfa Aesar, 99.99% purity) were used as working anodes and gold foils of the same dimensions were used as cathodes. The gold electrodes were arranged parallel to the graphite electrodes with a fixed distance of 2 cm. The electrolyte for the exfoliation was prepared by dissolving ammonium sulphate (0.1 M, 0.93 g) and butylamine (30 mg, 0.41 mmol, Aldrich, 99.5% purity) in 70 ml deionised water. After the electrodes were immersed in the electrolyte (6 cm² active electrode area in the electrolyte solution), a constant potential of 10 V was applied to start the exfoliation process. After the exfoliation was complete and the graphite foil had been consumed, the suspended graphene flakes were separated using a 0.2 μm PC (polycarbonate) filter and washed with deionised water. The washing process was repeated three times (3×400 ml) to wash out any residues such as ammonium sulphate and butylamine. The dark grey product (60 mg) was then dispersed in deionised water (30 ml) using mild ultrasound treatment (30 min ultrasound bath). This dispersion was left to stand for 24 hours in order to allow non-exfoliated, non-functionalised platelets and larger particles to sediment. The supernatant dispersion was then removed. The aqueous dispersion obtained in this way contained functionalised graphene in a concentration of 0.1 mg/ml and was stable for one week.

Figure 13A:
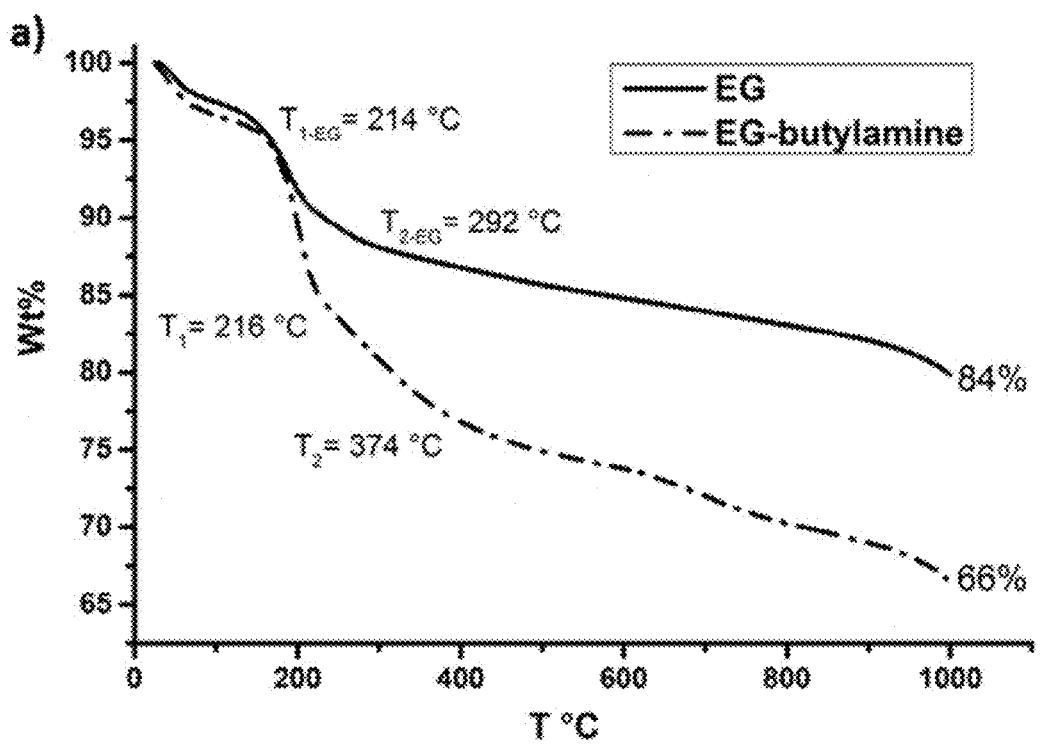

A residual mass of 66 wt. % was determined in TGA measurements, wherein the loss was essentially due to the separation of the butyl groups at 374° C. (FIG. 13a).

Figure 13B:
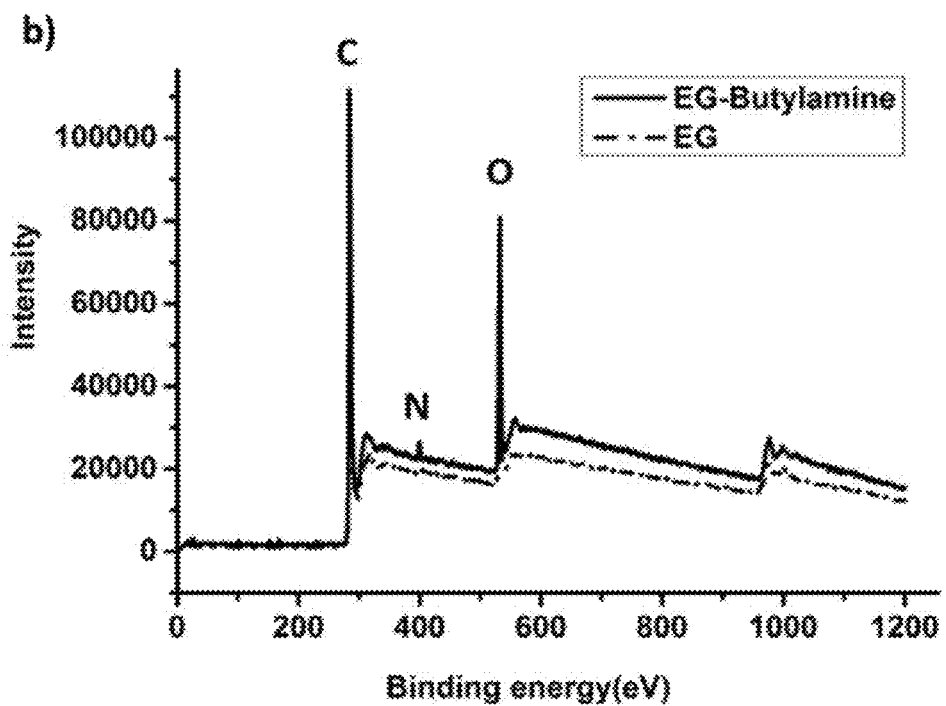
Figure 13C:
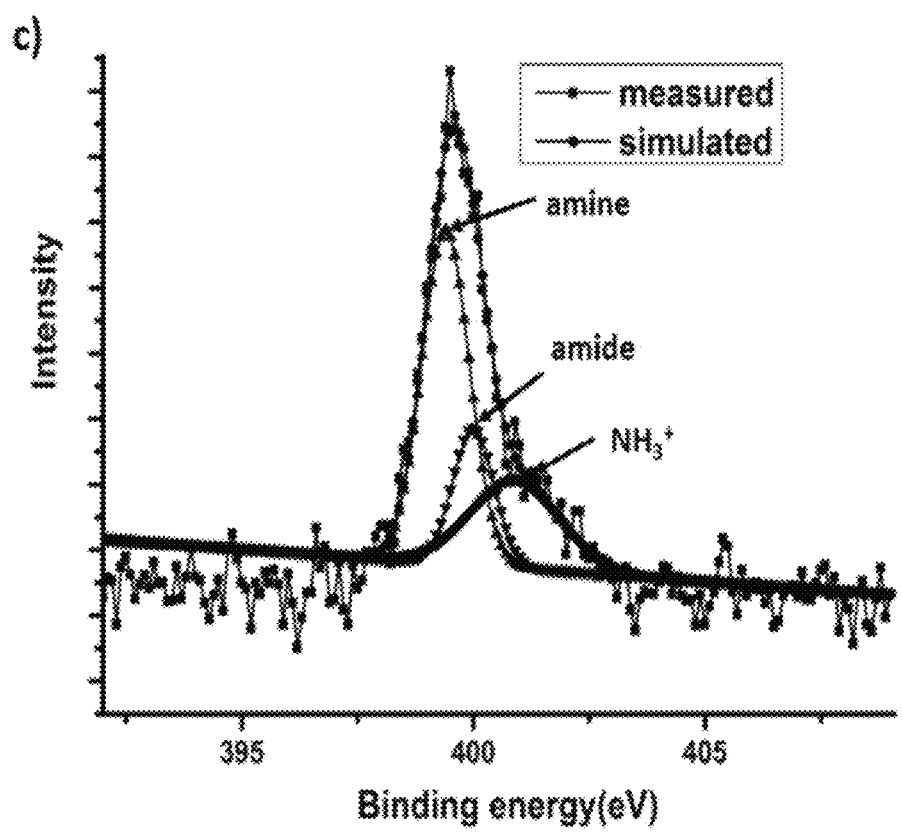

X-ray photoelectron spectroscopy (XPS) showed a nitrogen content of 1.11 atom %, which can be attributed to the butylamine groups (FIG. 13b). The high-resolution spectrum of the N1s region shows three main bands which can be attributed to the amide, amine and NH3+ groups (FIG. 13c).

Figure 13D:
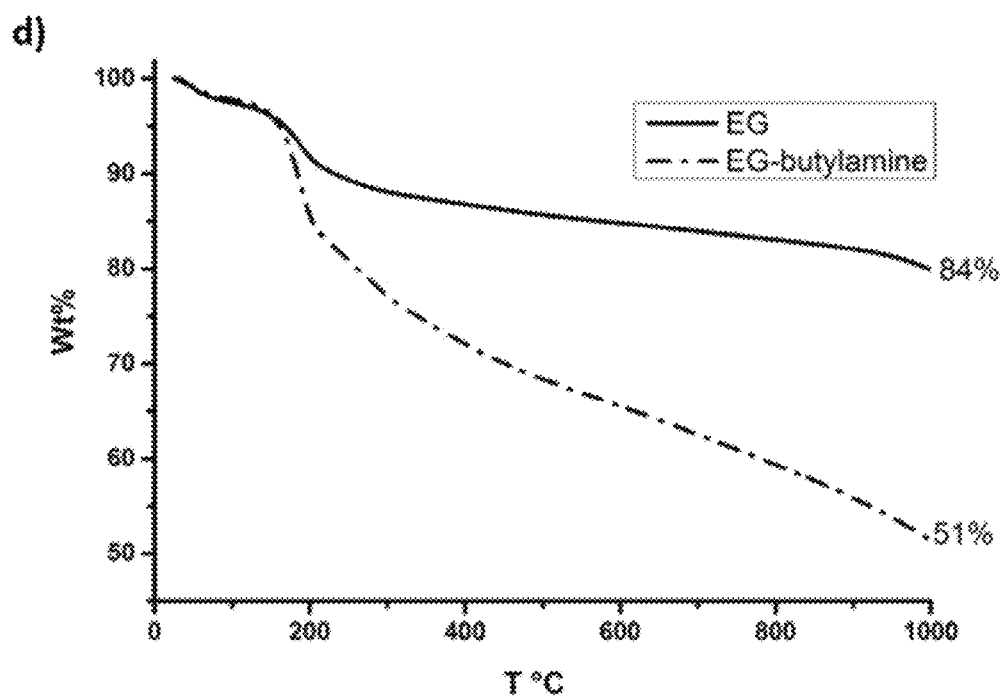

The degree of functionalisation could be increased by increasing the butylamine concentration (150 mg, 2 mmol) under otherwise the same conditions as above. This could also be demonstrated by an increased loss of mass in the TGA down to a residual mass of 51 wt. % (FIG. 13d).

The method was successfully carried out in an analogous manner with other amines, such as tert-Octylamine, melamine and 2-amino-2-(hydroxymethyl)-1,3-propanediol (TRIS).

Embodiment 7

Electrochemical Exfoliation and In Situ Functionalisation of Graphite with Valeric Acid The graphite exfoliation was carried out in a two-electrode system, wherein graphite foils (2 cm×3 cm, 100 mg per foil) (Alfa Aesar, 99.99% purity) were used as working anodes and gold foils of the same dimensions were used as cathodes. The gold electrodes were arranged parallel to the graphite electrodes with a fixed distance of 2 cm. The electrolyte for the exfoliation was prepared by dissolving ammonium sulphate (0.1 M, 0.93 g) and valeric acid (30 mg, 0.3 mmol, Alfa Aesar, 99% purity) in 70 ml deionised water. After the electrodes were immersed in the electrolyte (6 cm² active electrode area in the electrolyte solution), a constant potential of 10 V was applied to start the exfoliation process.

After the exfoliation was complete and the graphite foil had been consumed, the suspended graphene flakes were separated using a 0.2 μm PC (polycarbonate) filter and washed with deionised water. The washing process was repeated three times (3×400 ml) to wash out any residues such as ammonium sulphate and valeric acid. The dark grey product (60 mg) was then dispersed in deionised water (30 ml) using mild ultrasound treatment (30 min ultrasound bath). This dispersion was left to stand for 24 hours in order to allow non-exfoliated, non-functionalised platelets and larger particles to sediment. The supernatant dispersion was then removed. The aqueous dispersion thus obtained contained graphene in a concentration of 0.1 mg/ml and was stable for one week.

Figure 14A:
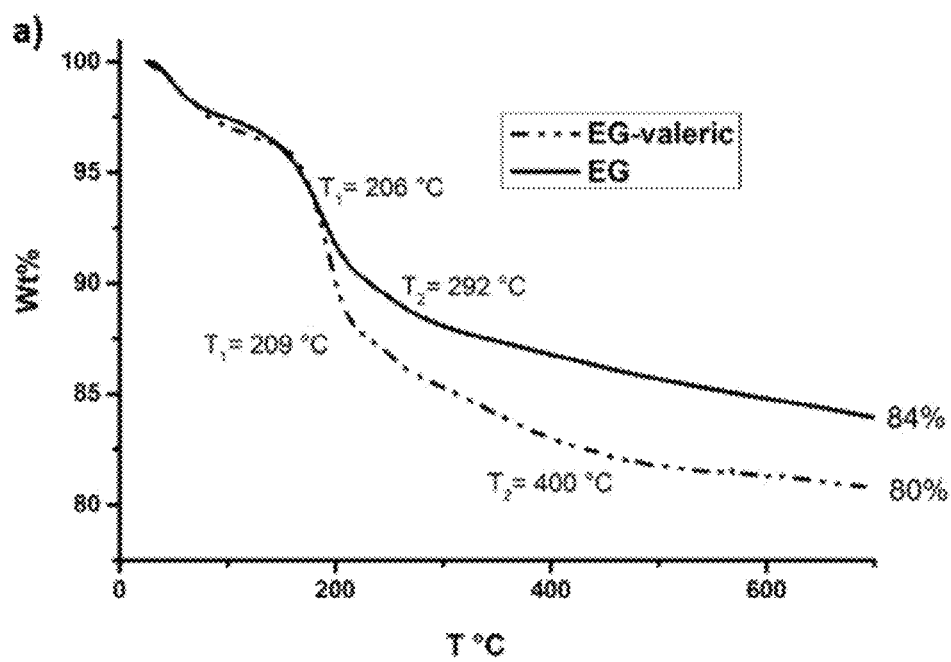
Figure 14B:
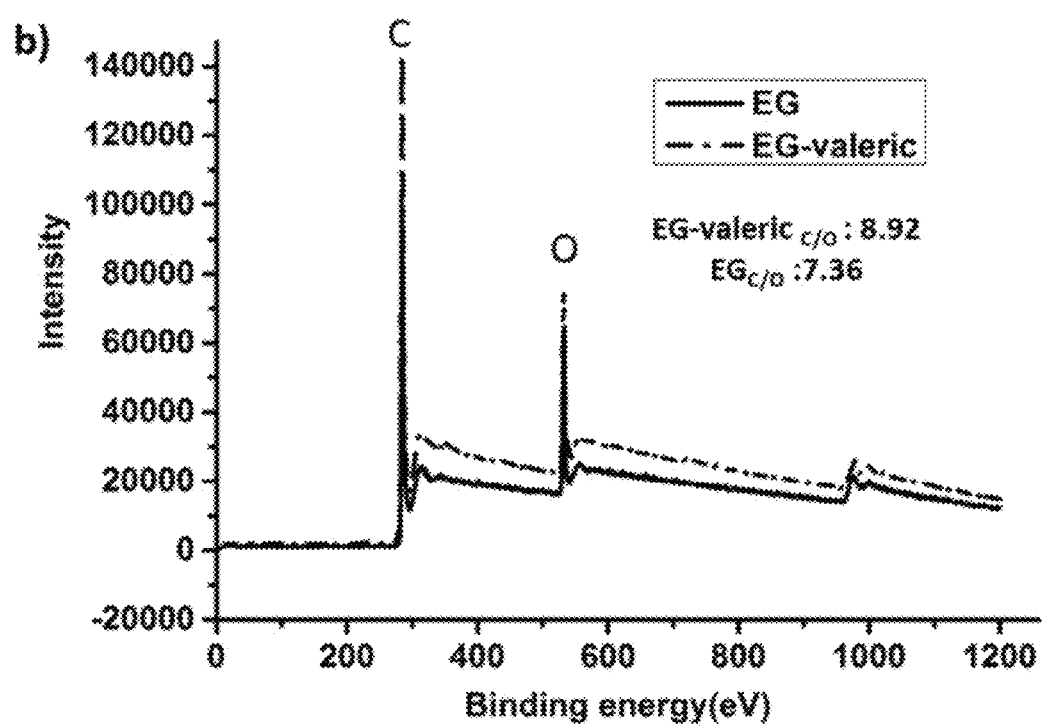

Successful functionalisation could be demonstrated by TGA, where the functionalised EG showed a 4 wt. % greater loss of mass compared to unfunctionalised EG (FIG. 14a).

Figure 2:
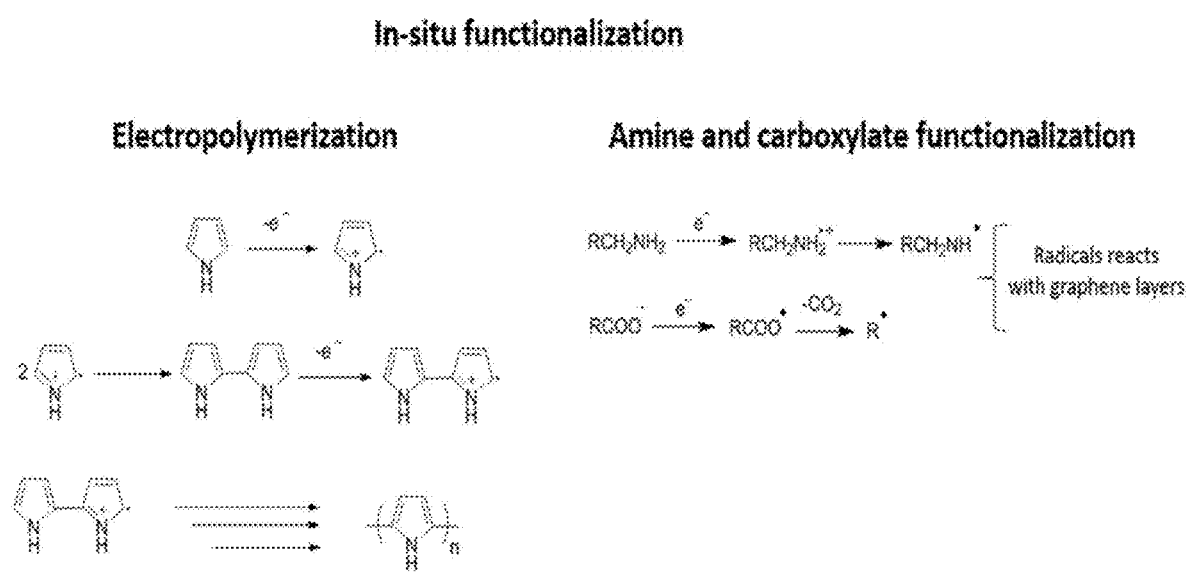

At the same time, X-ray photoelectron spectroscopy (XPS) showed an increase in the C/O ratio to ~9 (compared to unfunctionalised EG: ~7.3) (FIG. 14b), which can be explained in terms of the attack and functionalisation with pentyl radicals on the graphene surface (FIG. 2).

Embodiment 8

Electrochemical Exfoliation of Graphene and Subsequent Functionalisation with Polypyrrole The graphite exfoliation was carried out in a two-electrode system, wherein graphite foils (2 cm×3 cm, 100 mg per foil) (Alfa Aesar, 99.99% purity) were used as working anodes and gold foils of the same dimensions were used as cathodes. The gold electrodes were arranged parallel to the graphite electrodes with a fixed distance of 2 cm. The electrolyte for the exfoliation was prepared by dissolving ammonium sulphate (0.1 M, 0.93 g) in 70 ml deionised water. After the electrodes were immersed in the electrolyte (6 cm² active electrode area in the electrolyte solution), a constant potential of 10 V was applied to start the exfoliation process.

After the exfoliation was complete and the graphite foil had been consumed, pyrrole (100 µl, 1.5 mmol, Sigma-Aldrich, 98% purity) was added and the mixture was homogenised for 5 min in an ultrasound bath and then stirred for 30 min. The suspended graphene flakes were then separated using a 0.2 µm PC (polycarbonate) filter and washed with deionised water. The washing process was repeated three times (3×400 ml) to wash out any residues such as ammonium sulphate and pyrrole. The dark grey product (60 mg) was then dispersed in deionised water (30 ml) using mild ultrasound treatment (30 min ultrasound bath). This dispersion was left to stand for 24 hours in order to allow non-exfoliated, non-functionalised platelets and larger particles to sediment. The supernatant dispersion was then removed. The aqueous dispersion obtained in this way contained functionalised graphene in a concentration of 0.2 mg/ml and was stable for one week.

Figure 15:
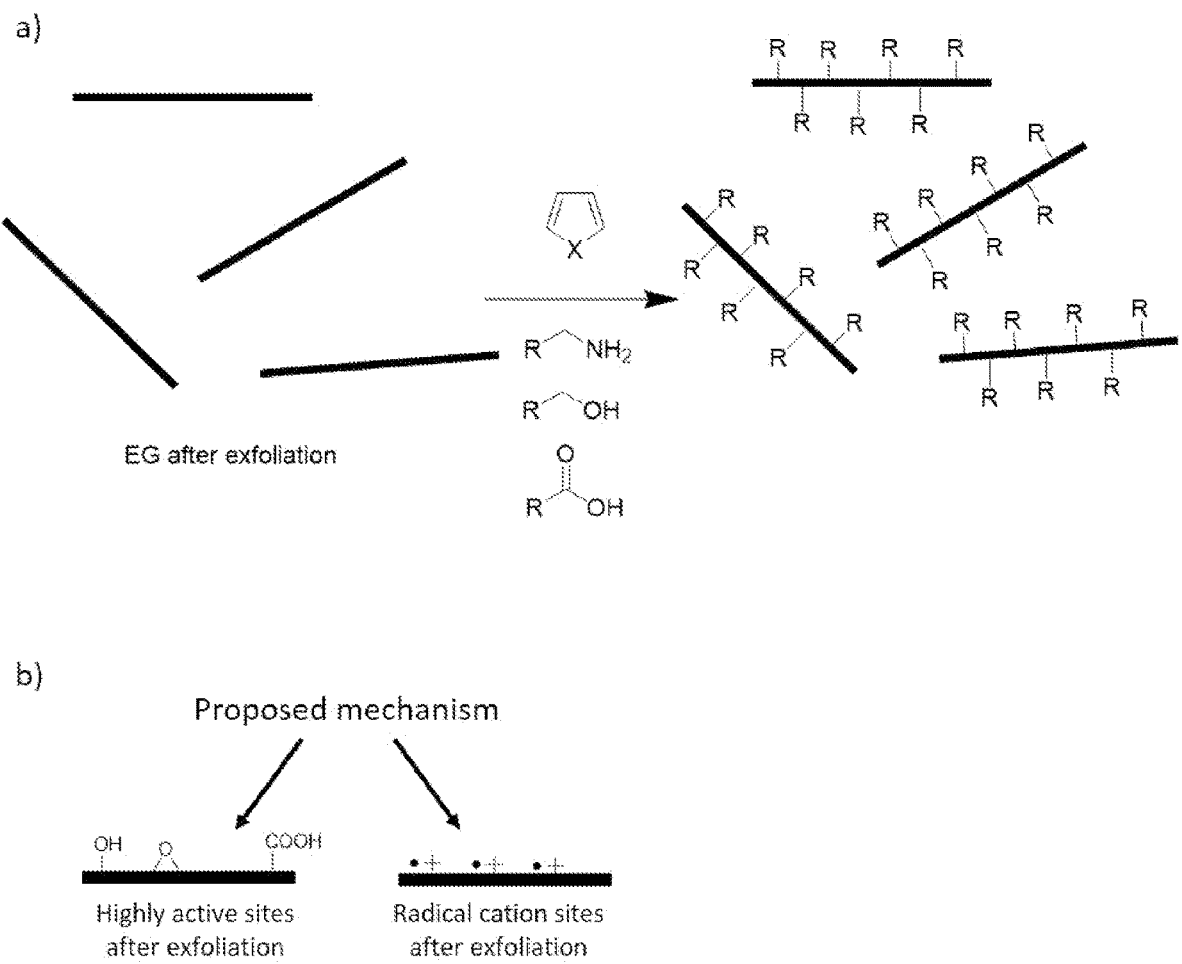
Figure 16A:
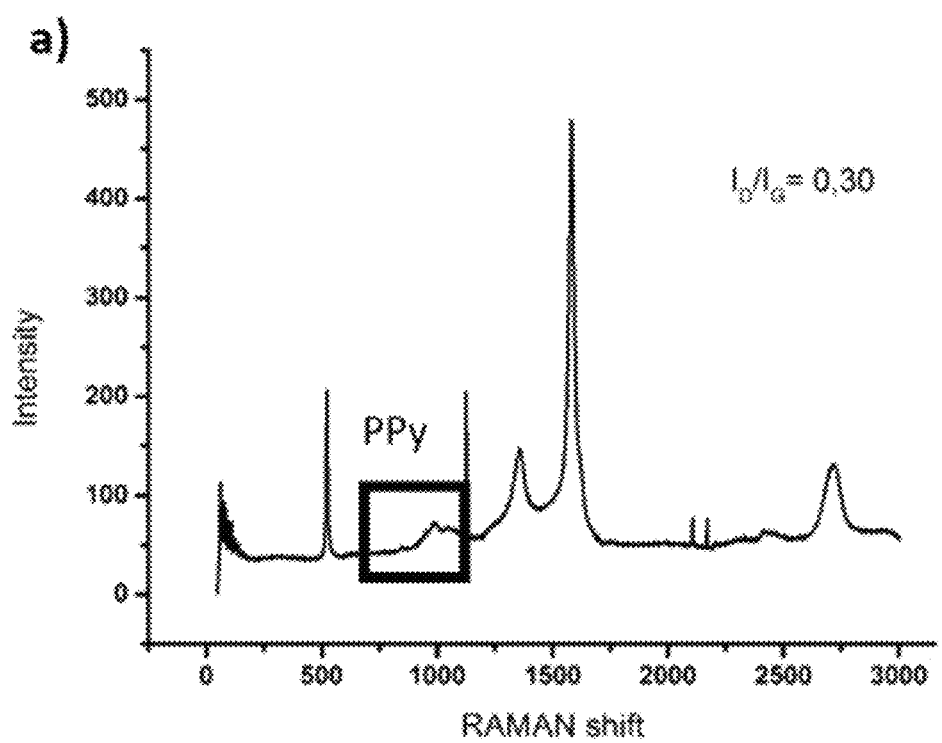

The proposed mechanism for direct functionalisation is shown in FIG. 15. Through the process of electrochemical exfoliation, there are free radicals on the surface of the EG, which are stabilised by the extensive network of conjugated electrons (FIG. 15b). These radicals and anions can be used as a starting point for free radical and oxidative polymerisation reactions in order to covalently functionalise the graphene surface. Another possible mechanism is the activation of oxygen-containing groups (in particular epoxy) on the graphene surface by electrochemical exfoliation (FIG. 15b).

Figure 16B:
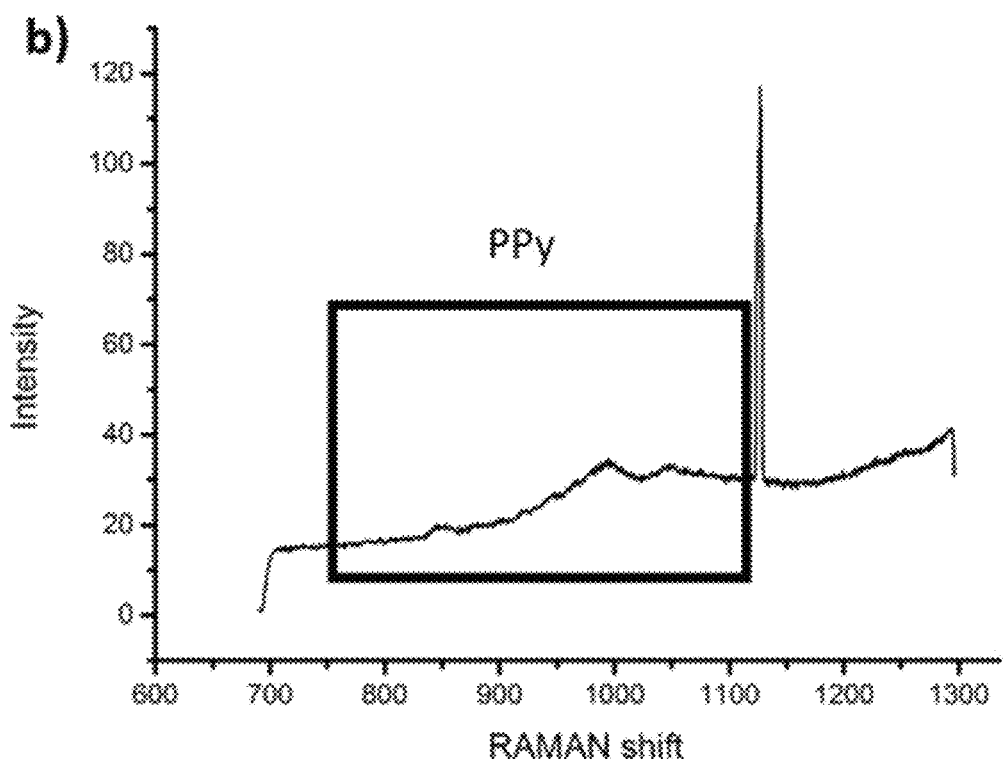

The RAMAN spectrum showed an $I_D/I_G$ ratio of 0.3. In addition, the RAMAN spectrum indicated three bands at 848.5 cm$^{-1}$, 994.9 cm$^{-1}$ and 1050.1 cm$^{-1}$ (FIG. 16a), which can be attributed to the functionalisation of EG with polypyrrole (EG-PPy) and are not observed in unfunctionalised EG (FIG. 16b).

Figure 16C:
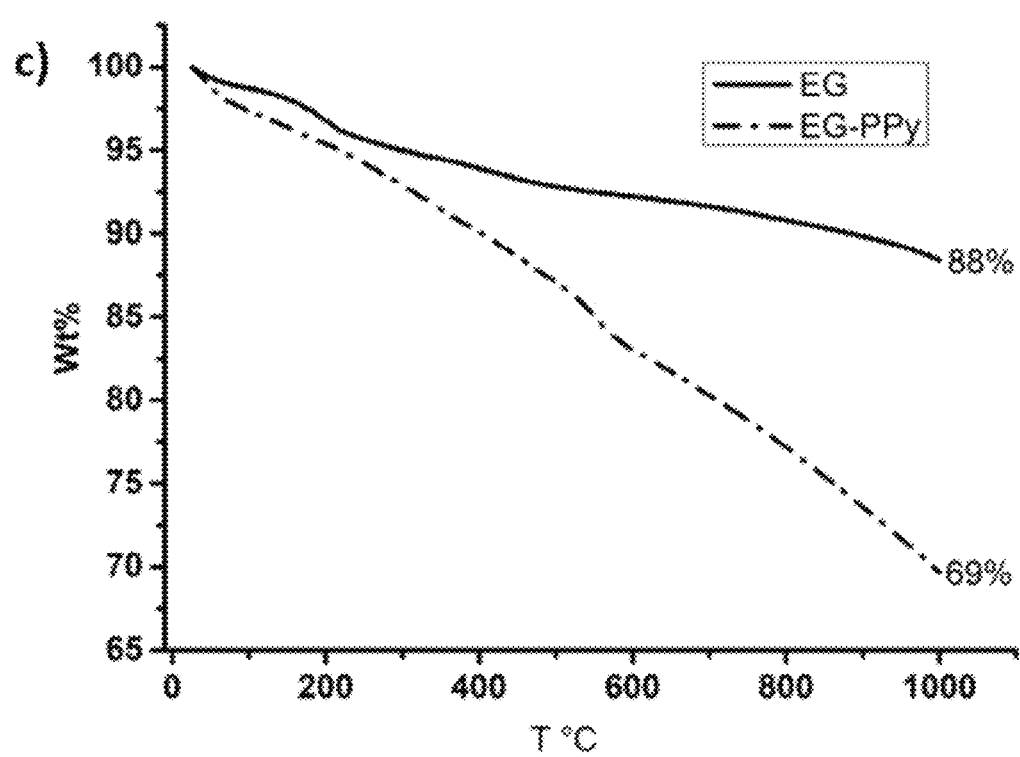

In addition, successful functionalisation could be demonstrated by TGA, where the functionalised EG showed a 19 wt. % higher loss of mass compared to unfunctionalised EG (FIG. 16c).

Figure 17A:
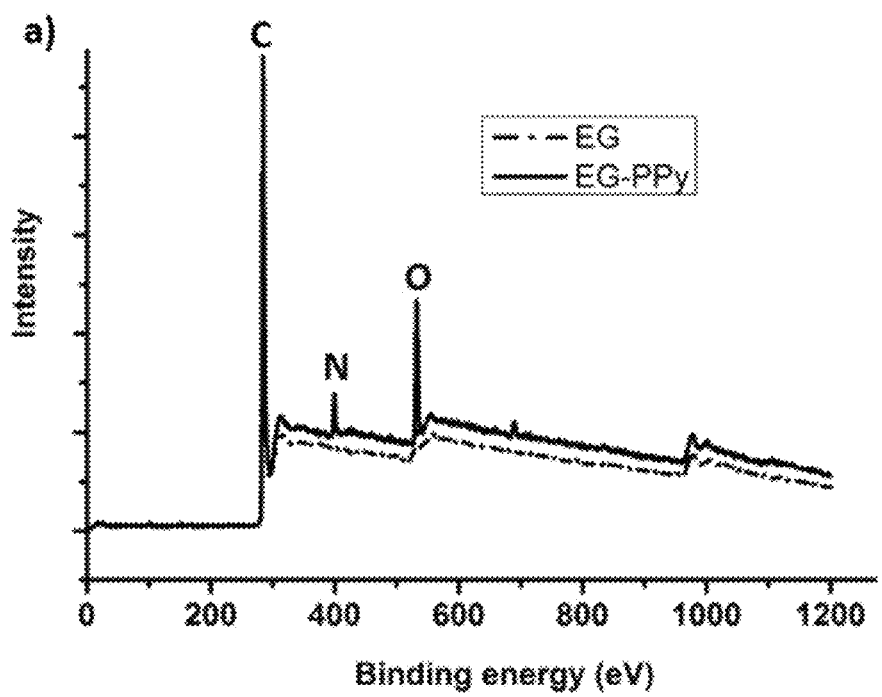
Figure 17B:
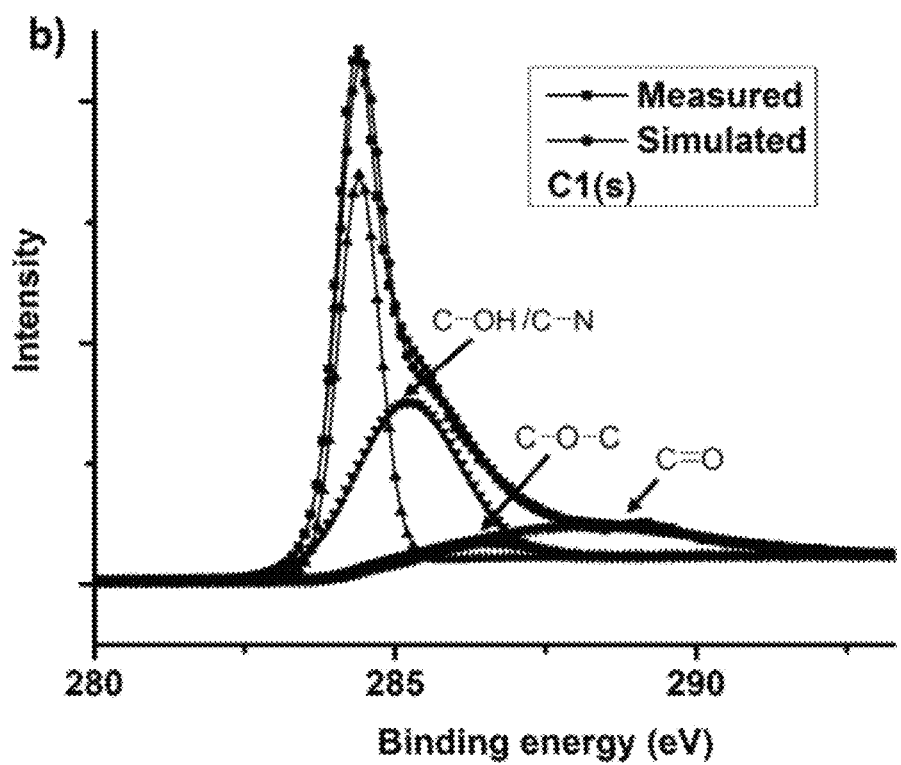

XPS measurements showed an oxygen content of 10.92 atom % (EG) and 8.43 atom % (EG-PPy) as well as a proportion of 3.37 atom % nitrogen for EG-PPy which can be attributed to polypyrrole functionalisation (FIG. 17a).

Figure 17C:
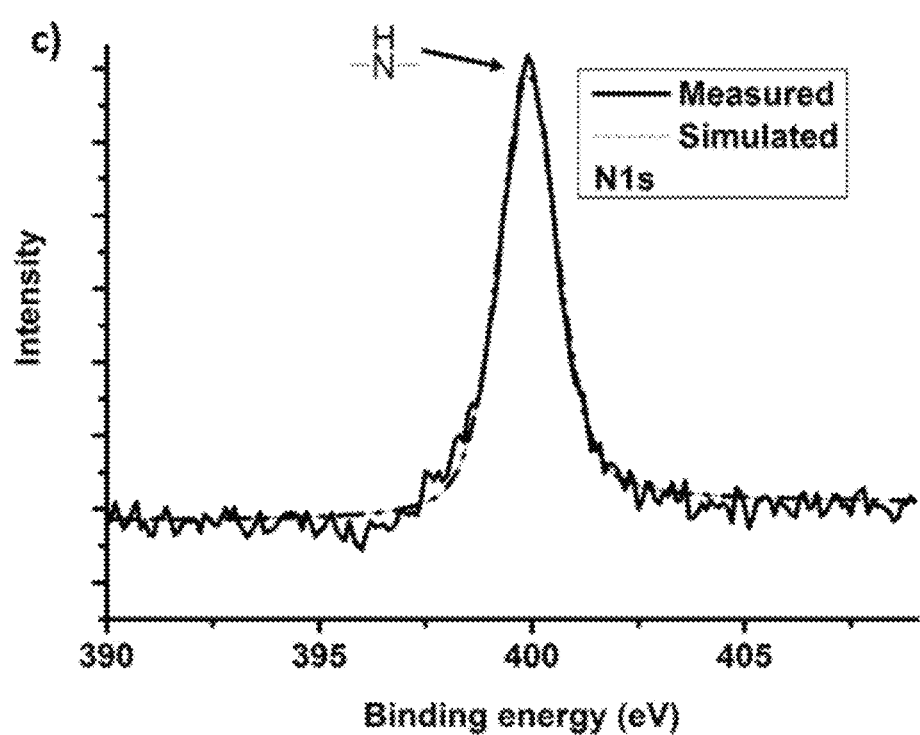

The high-resolution spectrum of the N1s region shows a main band at 400 eV which can be attributed to the —NH groups as well as the band at 401 eV which can be attributed to the polaron structure (C—N$^+$) of polypyrrole (FIG. 17c). The high-resolution spectrum of the C1s region (FIG. 17b) shows a band at 285.5 eV which is attributed to the C—N bond and which is not detectable in unfunctionalised EG.

Embodiment 9

Electrochemical Exfoliation of Graphene and Direct Functionalisation with Valeric Acid Due to the effects of electrochemical exfoliation on the surface of graphene and the generation of active/reactive centres (see FIG. 15), the surface can also be functionalised with various other agents which contain, for example, amine groups or carboxylate groups, as will be illustrated in the following example.

The graphite exfoliation was carried out in a two-electrode system, wherein graphite foils (2 cm×3 cm, 100 mg per foil) (Alfa Aesar, 99.99% purity) were used as working anodes and gold foils of the same dimensions were used as cathodes. The gold electrodes were arranged parallel to the graphite electrodes with a fixed distance of 2 cm. The electrolyte for the exfoliation was prepared by dissolving ammonium sulphate (0.1 M, 0.93 g) in 70 ml deionised water. After the electrodes were immersed in the electrolyte (6 cm² active electrode area in the electrolyte solution), a constant potential of 10 V was applied to start the exfoliation process.

After the exfoliation was complete and the graphite foil had been consumed, valeric acid (100 mg, 0.98 mmol, Alfa-Aesar, 99% purity) was added and the mixture was homogenised for 5 min in an ultrasound bath and then stirred for 30 min. The suspended graphene flakes were then separated using a 0.2 µm PC (polycarbonate) filter and washed with deionised water. The washing process was repeated three times (3×400 ml) to wash out any residues such as ammonium sulphate and pyrrole. The dark grey product (60 mg) was then dispersed in deionised water (30 ml) using mild ultrasound treatment (30 min ultrasound bath). This dispersion was left to stand for 24 hours in order to allow non-exfoliated, non-functionalised platelets and larger particles to sediment. The supernatant was then removed. The aqueous dispersion thus obtained contained graphene in a concentration of 0.1 mg/ml and was stable for one week.

Successful functionalisation could be demonstrated by TGA, where the functionalised EG showed a residual mass of almost 63 wt. % compared to unfunctionalised EG.

Figure 18A:
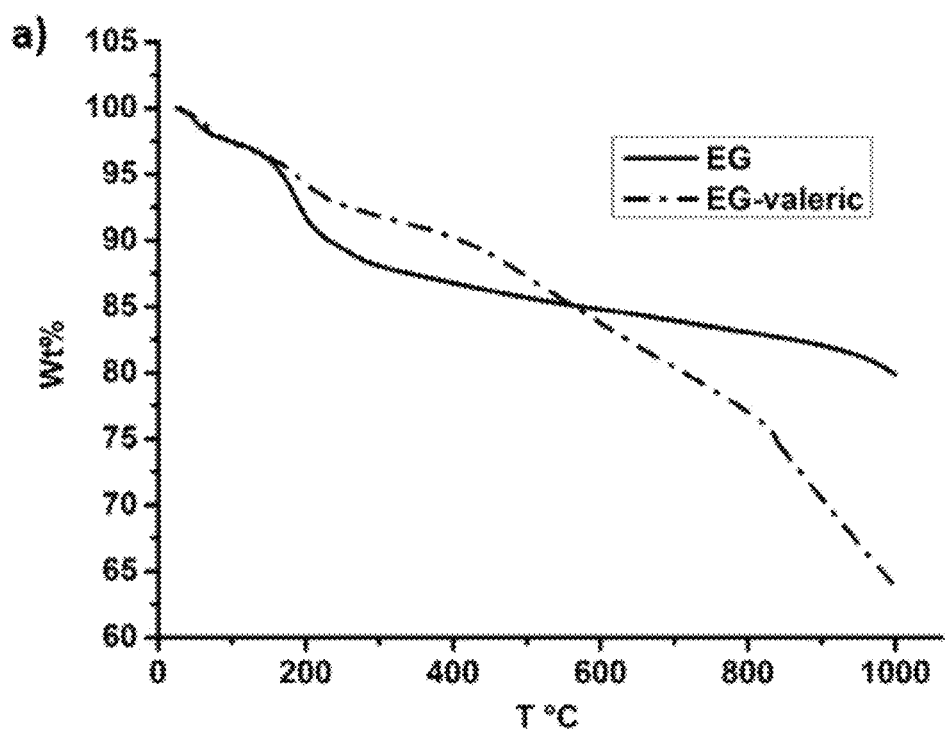

In addition, the step at approx. 200° C., which is usually attributed to the conversion of epoxy groups, is markedly less pronounced than in unfunctionalised EG, which indicates a reaction between the epoxy groups in EG and valeric acid (FIG. 18a).

Embodiment 10

Electrochemical Exfoliation of Graphene and Direct Functionalisation with Amines The graphite exfoliation was carried out in a two-electrode system, wherein graphite foils (2 cm×3 cm, 100 mg per foil) (Alfa Aesar, 99.99% purity) were used as working anodes and gold foils of the same dimensions were used as cathodes. The gold electrodes were arranged parallel to the graphite electrodes with a fixed distance of 2 cm. The electrolyte for the exfoliation was prepared by dissolving ammonium sulphate (0.1 M, 0.93 g) in 70 ml deionised water. After the electrodes were immersed in the electrolyte (6 cm² active electrode area in the electrolyte), a constant potential of 10 V was applied to start the exfoliation process.

After the exfoliation was complete and the graphite foil had been consumed, butylamine (100 mg, 1.37 mmol, Sigma-Aldrich, 99.5% purity) was added to the electrolyte and the mixture was homogenised for 5 min in an ultrasound bath and then stirred for 30 min. The suspended graphene flakes were then separated using a 0.2 μm PC (polycarbonate) filter and washed with deionised water. The washing process was repeated three times (3×400 ml) to wash out any residues such as ammonium sulphate and pyrrole. The dark grey product (60 mg) was then dispersed in deionised water (30 ml) using mild ultrasound treatment (30 min ultrasound bath). This dispersion was left to stand for 24 hours in order to allow non-exfoliated, non-functionalised platelets and larger particles to sediment. The supernatant was then removed. The aqueous dispersion thus obtained contained graphene in a concentration of 0.1 mg/ml and was stable for one week.

Figure 18B:
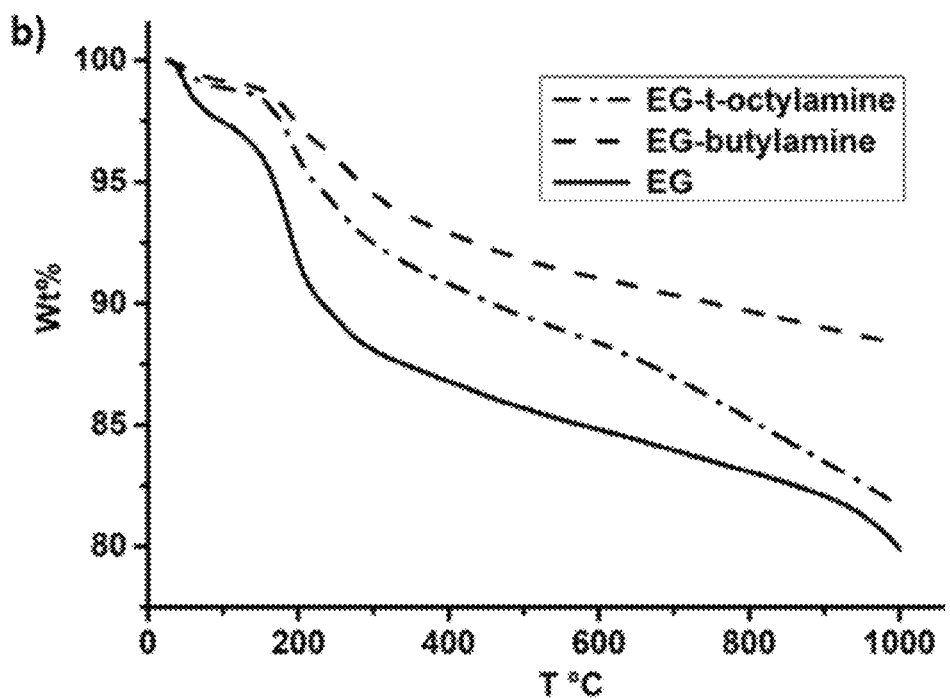

Successful functionalisation could be demonstrated using TGA. In FIG. 18 *a* it can be seen that the step at approx. 200° C., which is usually attributed to the conversion of epoxy groups, is markedly less pronounced than in unfunctionalised EG. This indicates a reaction between the epoxy groups in EG and butylamine. Functionalisation with tert-Octylamine was demonstrated in an analogous manner by TGA (FIG. 18 *b*).

Embodiment 11

Functionalised Graphene Powder as a Cathode Additive in Lithium-Ion Batteries

Functionalised graphene (EG-SPANI) was added in a solution-mixing method as a leading additive to typical cathode materials such as $LiFePO_4$ and $LiCoO_2$, thus producing electrodes for lithium-ion batteries.

For this purpose, the dispersion produced according to embodiment 3 was mixed with a commercially available cathode material ($LiFePO_4$/$LiCoO_2$) in a mass ratio of 1:1 using ultrasound. After filtration and drying of the mixture, it was filled as a cathode material in a half cell in which lithium foil was arranged as the anode.

Figure 20:
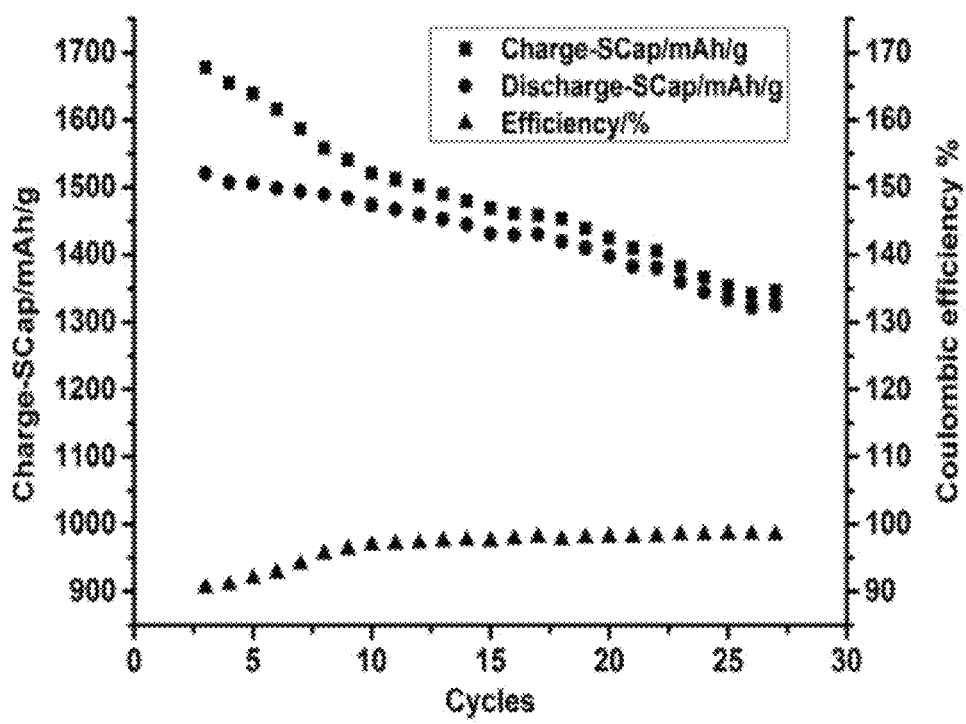

At a constant current rate of 0.1 C (1 C=170 mAh/g), the material showed a charging and discharging capacity of 120 mAh/g (FIG. 20).

Embodiment 12

Figure 21:
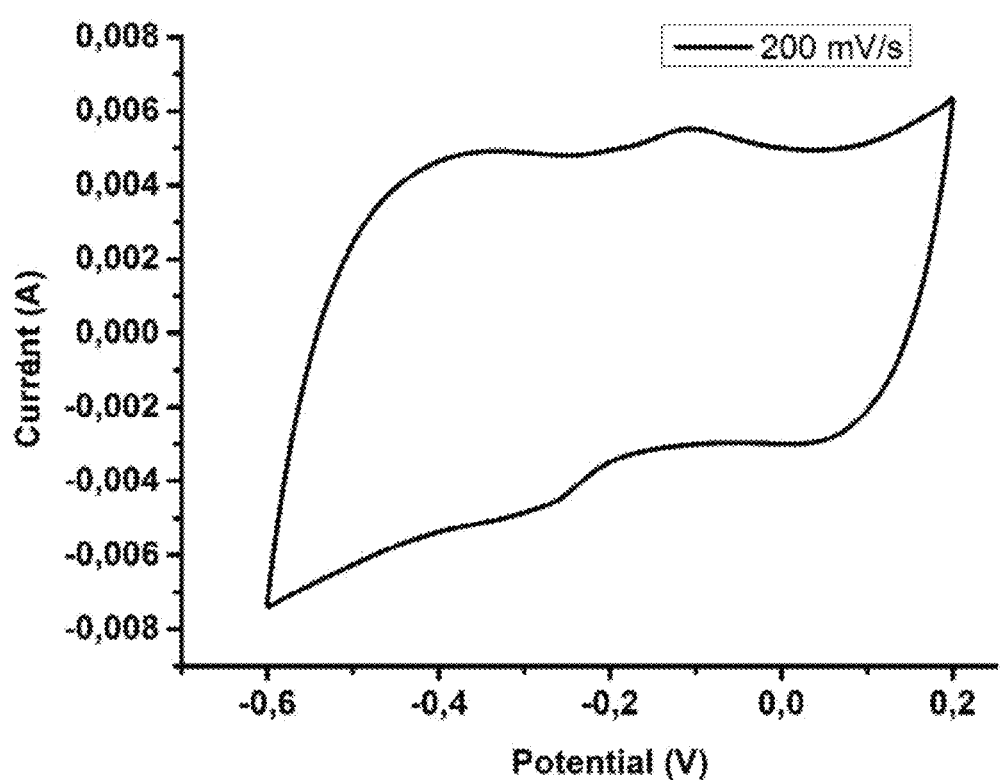

Functionalised Graphene as Free-Standing Electrode Films in Super Capacitor Cells Free-standing films made of functionalised graphene (EG-SPANI) were used as electrodes in a 3-electrode supercapacitor cell, with platinum wire as the counter electrode, AgCl as the reference electrode and 0.1 M of sulphuric acid as the electrolyte. Functionalised graphene showed a good capacity of up to 312 F/g, while unfunctionalised EG had a capacity of less than 20 F/g (FIG. 21).

The invention claimed is:

1. A method for producing a surfactant-free dispersion of functionalised semiconductor or conductor material from a two-dimensional layered structured carbon-based base material by electrolytic exfoliation in an electrolysis cell, comprising at least one electrode pair consisting of first and second electrodes, and an aqueous and/or alcoholic electrolyte solution containing sulphuric acid and/or at least one salt selected from sulphate and/or hydrogen sulphate and/or perchlorate and/or persulphate salt,
comprising the steps of:
a) bringing the electrode pair(s) into contact with the electrolyte solution,
b) electrolytically exfoliating the base material by applying a voltage between the first and the second electrode, wherein at least the first of the electrodes of the electrode pair(s) contains the two-dimensional layered structured carbon-based base material, the first electrode being connected as an anode,
c) separating the functionalised semiconductor or conductor material from the electrolyte solution, and
d) dispersing the functionalised semiconductor or conductor material after separation, without the use of surfactants,
wherein at least one organic compound is added to the electrolyte solution before and/or during the electrolytic exfoliation, wherein the organic compound is selected from
i. monomers of electrically conductive polymers, and/or
ii. free radical polymerisable, water-soluble vinyl monomers which have in their structure at least one amide group and/or at least one anionic functional group.

2. The method according to claim 1, wherein the semiconductor or conductor material is selected from graphene, graphene derivatives, and carbon-based semiconductor or conductor polymers.

3. The method according to claim 1, wherein the two-dimensional layered structured carbon-based base material is selected from semiconductive or conductive carbon modifications, and carbon-based semiconductor or conductor polymers in the form of two-dimensionally structured carbon-based base material.

4. The method according to claim 1, wherein the second electrode comprises a metal.

5. The method according to claim 1, wherein the voltage is 1 to 20 V.

6. The method according to claim 1, wherein the monomers of electrically conductive polymers are selected from aromatic amines, anilines, pyrroles, thiophenes and/or their derivatives.

7. The method according to claim 2, wherein the second electrode comprises a metal.

8. The method according to claim 3, wherein the second electrode comprises a metal.

9. The method according to claim 8, wherein the voltage is 1 to 20 V.

10. The method according to claim 2, wherein the monomers of electrically conductive polymers are selected from aromatic amines, anilines, pyrroles, thiophenes and/or their derivatives.

11. The method according to claim 3, wherein the monomers of electrically conductive polymers are selected from aromatic amines, anilines, pyrroles, thiophenes and/or their derivatives.

* * * * *